United States Patent
Akono et al.

(10) Patent No.: US 12,473,232 B2
(45) Date of Patent: Nov. 18, 2025

(54) CARBON FIBER-REINFORCED METAKAOLIN-BASED GEOPOLYMER COMPOSITES

(71) Applicant: Northwestern University, Evanston, IL (US)

(72) Inventors: Ange-Therese Akono, Evanston, IL (US); Jiaxin Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 673 days.

(21) Appl. No.: 17/792,502

(22) PCT Filed: Jan. 29, 2021

(86) PCT No.: PCT/US2021/015651
§ 371 (c)(1),
(2) Date: Jul. 13, 2022

(87) PCT Pub. No.: WO2021/155108
PCT Pub. Date: Aug. 5, 2021

(65) Prior Publication Data
US 2023/0072824 A1    Mar. 9, 2023

Related U.S. Application Data

(60) Provisional application No. 62/967,142, filed on Jan. 29, 2020.

(51) Int. Cl.
*C04B 28/00* (2006.01)
*C04B 14/02* (2006.01)
*C04B 111/00* (2006.01)

(52) U.S. Cl.
CPC .......... *C04B 28/006* (2013.01); *C04B 14/026* (2013.01); *C04B 2111/00181* (2013.01); *C04B 2201/50* (2013.01)

(58) Field of Classification Search
CPC ............... C04B 28/006; C04B 14/026; C04B 2111/00181; C04B 2201/50; C04B 2111/1006; Y02P 40/10
See application file for complete search history.

(56) References Cited

U.S. PATENT DOCUMENTS

| | | | |
|---|---|---|---|
| 7,041,167 B2 | 5/2006 | Jiang | |
| 8,480,801 B2 * | 7/2013 | Fuji | C04B 28/26 106/718 |
| 8,865,107 B2 | 10/2014 | Hersam et al. | |
| 9,365,456 B2 | 6/2016 | Shah et al. | |
| 9,499,439 B2 | 11/2016 | Shah et al. | |
| 9,828,290 B2 | 11/2017 | Christiansen et al. | |
| 2015/0152314 A1 | 6/2015 | Muthusamy et al. | |
| 2019/0382269 A1 | 12/2019 | Askari et al. | |
| 2022/0017418 A1 | 1/2022 | Akono et al. | |
| 2022/0242787 A1 | 8/2022 | Akono | |

FOREIGN PATENT DOCUMENTS

| | | |
|---|---|---|
| CN | 107382148 A | 11/2017 |
| CN | 108863127 A | 11/2018 |
| PL | 236974 B1 | 8/2019 |
| WO | WO 2013/096990 A1 | 7/2013 |
| WO | WO 2020/092449 A1 | 5/2020 |

OTHER PUBLICATIONS

Non-Final Office Action issued on Oct. 1, 2024 for U.S. Appl. No. 17/588,586; pp. 33.
Sun, Xiaoyan, et al. "Influence of multi-walled nanotubes on the fresh and hardened properties of a 3D printing PVA mortar ink." *Construction and Building Materials* 247 (2020): 118590.
Su, Zijian, Wei Hou, and Zengqing Sun. "Recent advances in carbon nanotube-geopolymer composite." *Construction and Building Materials* 252 (2020): 118940.
Jittabut, Pongsak, and Suksun Horpibulsuk. "Physical and Microstructure Properties of Geopolymer Nanocomposite Reinforced with Carbon Nanotubes." *Materials Today: Proceedings* 17 (2019): 1682-1692.
Yuan, Jingkun, et al. "In situ processing of MWCNTs/leucite composites through geopolymer precursor." *Journal of the European Ceramic Society* 37.5 (2017): 2219-2226.
Ma, Y., G. Ye, and J. Hu. "Micro-mechanical properties of alkali-activated fly ash evaluated by nanoindentation." *Construction and Building Materials* 147 (2017): 407-416.
Da Luz, Graziele, et al. "Effect of pristine and functionalized carbon nanotubes on microstructural, rheological, and mechanical behaviors of metakaolin-based geopolymer." *Cement and Concrete Composites* 104 (2019): 103332.
Ghasan F. Huseien et al., "Effect of metakaolin replaced granulated blasé furnace slag on fresh and early strength properties of geopolymer mortar," *Ain Shams Engineering Journal* (2018), vol. 9; pp. 1557-1566.
Ange-Therese Akono, "Fracture behavior of metakaolin-based geopolymer reinforced with carbon nanofibers," *Int J Ceramic Eng Sci.* 2020, vol. 2; pp. 234-242. https://doi.org/10.1002/ces2.10060.
Pavel Rovnanik et al., "Effect of carbon nanotubes on the mechanical fracture properties of fly ash geopolymer," *Procedia Engineering* (2016), vol. 151; pp. 321-328.
R.A. Sa Ribeiro et al., "A Review of Particle-and Fiber-Reinforced Metakaolin-Based Geopolymer Composites," *J. Ceram. Sci. Technol.* (2017), vol. 8, No. 3; pp. 307-322.

(Continued)

Primary Examiner — Anthony J Green
(74) *Attorney, Agent, or Firm* — Bell & Manning, LLC

(57) ABSTRACT

Methods for making carbon-fiber reinforced geopolymer composites are provided. The methods produce metakaolin-based geopolymer composites in which multiwalled carbon nanotubes and/or carbon nanofibers are well dispersed in an metakaolin-based geopolymer matrix. The mixing protocols of the methods used to produce carbon-fiber reinforced geopolymer composites produce composites with reduced porosity, high elastic moduli, high strength, and/or high fracture toughness.

4 Claims, 20 Drawing Sheets

(56) References Cited

OTHER PUBLICATIONS

Tiesong Lin et al., "Effects of fiber length on mechanical properties and fracture behavior of short carbon fiber reinforced geopolymer matrix composites," *Materials Science and Engineering A* (2008), vol. 497; pp. 181-185.
Abbasi, Saloumeh Mesgari, et al. "Microstructure and mechanical properties of a metakaolinite-based geopolymer nanocomposite reinforced with carbon nanotubes." *Ceramics International* 42.14 (2016): 15171-15176.
A. Natali et al., "Novel fiber-reinforced composite materials based on sustainable geopolymer matrix," *Procedia Engineering* (2011), vol. 21; pp. 1124-1131.
Peigang He et al., "Effects of high-temperature heat treatment on the mechanical properties of unidirectional carbon fiber reinforced geopolymer composites," *Ceramics International* (2010), vol. 36; pp. 1447-1453.
Mohamed Saafi et al., "Multifunctional properties of carbon nanotube/fly ash geopolymeric nanocomposites," *Construction and Building Materials* (2013), vol. 49; pp. 46-55.
The International Search Report and Written Opinion issued on Jun. 9, 2021 for international patent application No. PCT/US21/15651; pp. 1-14.
Hiep Le Ma et al., Preparation and Mechanical Properties of Potassium Metakaolin Based Geopolymer Paste, Article in Advanced Engineering Forum—Feb. 2019, ISSN: 2234-991X, vol. 31; pp. 38-45.
Thomas Chudoba, Measurement of Hardness and Young's Modulus by Nanoindentation: Chapter 6, Nanostructured Coatings, Copyright 2006; pp. 1-5.
Tatiana D. Dimitrova et al., "Non-Aqueous, Surfactant-Free Antiform Emulsions: Properties and Triggered Release," *The Canadian Journal of Chemical Engineering*, Feb. 2014, vol. 92; pp. 330-336.
Xia Dong et al., "Effects of Carboxylated Multiwalled Carbon Nanotubes on the Function of Macrophages," Hindawi Publishing Corporation, *Journal of Nanomaterials*, vol. 2015, Article ID 638760; pp. 1-8. http://dx.doi.org/10.1155/2015/638760.
Wikipedia 'Elastic Modulus' May 21, 2018; pp. 1-4. https://en.wikipedia.org/w/index.php?title+Elastic_modulus&oldid+842299072>4.
Chunyu Li et al., "Single-walled carbon nanotubes as ultrahigh frequency nanomechanical resonators," *Physical Review B*, Aug. 2003, vol. 68; pp. 073405-073405-3.
Weina Meng et al., "Improving Flexural Performance of Ultra-High-Performance Concrete by Rheology Control of Suspending Mortar," Abstract, Improved Flexural Performance of Ultra-High-Performance Concrete by Rheology Control of Suspending Mortar, Jun. 1, 2019 (Jun. 1, 2019); pp. 1-4.
Hongjian Du et al., "Enhancement of barrier properties of cement mortar with graphene nanoplatelet," *Cement and Concrete Research* 76 (2015) 10-19.
Fakhim Babak et al., "Preparation and Mechanical Properties of Graphene Oxide: Cement Nanocomposites," Hindawi Publishing Corporation, *The Scientific World Journal*, vol. 2014, Article ID 276323, pp. 1-10.
Yakovlev et al., Cement Based Foam Concrete Reinforced by Carbon Nanotubes, Materials Science, vol. 12, No. 2, 2006, pp. 147-151.
Mitchell et al., The Effects of Solvents On C—S—H as Determined By Thermal Analysis, Journal of Thermal Analysis and Calorimetry, vol. 86, No. 3, Dec. 2006, pp. 591-594.
Al-Rub et al., On the aspect ratio effect of multi-walled carbon nanotube reinforcements on the mechanical properties of cementitious nanocomposites, Construction and Building Materials, vol. 35, May 31, 2012, pp. 647-655.
Hunashyal et al., Experimental investigation of the effect of carbon nanotubes and carbon fibres on the behaviour of plain cement composite beams, The IES Journal Part A: Civil & Structural Engineering, vol. 4, No. 1, Feb. 10, 2011, pp. 29-36.
Campillo et al., High-Performance Nanostructured Materials For Construction, Nanotechnology in Construction, 2004, pp. 215-225.
Jiang et al., Carbon Nanotubes as a New Reinforcement Material for Modern Cement-Based Binders, Nicom 2: $2^{nd}$ International Symposium on Nanotechnology in Construction, 2006, pp. 209-213.
Luo et al., The influence of surfactants on the processing of multi-walled carbon nanotubes in reinforced cement matrix composites, Phys. Status Solidi A, vol. 206, No. 12, Jul. 27, 2009, pp. 2783-2790.
Ferro et al., Carbon nanotubes cement composites, Frattura ed Integrità Strutturale, vol. 18, 2011, pp. 34-44.
Sobolkina et al., Dispersion of carbon nanotubes and its influence on the mechanical properties of the cement matrix, Cement & Concrete Composites, vol. 34, Aug. 8, 2012, pp. 1104-1113.
Pacheco-Torgal, Nanotechnology: Advantages and drawbacks in the field of construction and building materials, Construction and Building Materials, vol. 25, Aug. 1, 2010, pp. 582-590.
Knapen et al., Effect of free water removal from early-age hydrated cement pastes on thermal analysis, Construction and Building Materials, vol. 23, No. 11, Nov. 2009, pp. 3431-3438.
Han et al., Multifunctional and Smart Carbon Nanotube Reinforced Cement-Based Materials, Chapter 1 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 1-47.
Selvam et al., Application of Nanoscience Modeling to Understand the Atomic Structure of C—S—H, Chapter 3 from *Nanotechnology in Civil Infrastructure—A Paradigm Shift*, Kasthurirangan Gopalakrishnan, Bjorn Birgisson, Peter Taylor, and Nii O. Attoh-Okine (Eds.), Springer, 2011, pp. 85-102.
Birgisson et al., Optimization of Clay Addition for the Enhancement of Pozzolanic Reaction in Nano-modified Cement Paste, Chapter 7 from Nanotechnology in Civil Infrastructure—A Paradigm Shift, Kasthurirangan Gopalakrishnan, Bjorn Birgisson, Peter Taylor, and Nii O. Attoh-Okine (Eds.), Springer, 2011, pp. 225-236.
Sanchez et al., Nanotechnology in concrete—A review, Construction and Building Materials, vol. 24, May 15, 2010, pp. 2060-2071.
Melo et al., Macro- and Micro-Characterization of Mortars Produced with Carbon Nanotubes, ACI Materials Journal, vol. 108, No. 3, May-Jun. 2011, pp. 327-332.
Chen et al., Carbon nanotube-cement composites: A retrospect, The IES Journal Part A: Civil & Structural Engineering, vol. 4, No. 4, Sep. 19, 2011, pp. 254-265.
Nur Yazdani et al., "Carbon Nano-Tube and Nano-Fiber in Cement Mortar: Effect of Dosage Rate and Water-Cement Ratio," *International Journal of Material Science* (IJMSCI), Jun. 2014, vol. 4, Issue 2; pp. 45-52. Doi: 10.14355/ijmsci.2014.0402.01.
Reales OA, Toledo Filho RD. A review on the chemical, mechanical and microstructural characterization of carbon nanotubes-cement based composites. *Constr. Build. Mat.* Nov. 15, 2017;154; 697-710.
Liu J, Fu J, Ni T, Yang Y. Fracture toughness improvement of multi-wall carbon nanotubes/graphene sheets reinforced cement paste. *Constr. Build. Mat.* Mar. 10, 2019;200; 530-538.
Konsta-Gdoutos MS, Metaxa ZS, Shah, SP. Highly dispersed carbon nanotube reinforced cement based materials. *Cem. Concr. Res.* 2010;40 (7); 1052-1059.
Luo JL, Duan ZD, Zhao TJ, Li QY. Effect of multi-wall carbon nanotube on fracture mechanical property of cement-based composite. *Adv. Mat. Res.* 2011;146; 581-584.
Alafogianni P, Dassios K, Tsakiroglou CD, Matikas TE, Barkoula NM. Effect of CNT addition and dispersive agents on the transport properties and microstructure of cement mortars. *Constr. Build. Mat.* Feb. 10, 2019;197; 251-261.
Parveen S, Rana S, Fangueiro R. A review on nanomaterial dispersion, microstructure, and mechanical properties of carbon nanotube and nanofiber reinforced cementitious composites. *J. Nanomater.* Jan. 1, 2013. Doi: 10.1155/2013/710175.
Metaxa ZS, Konsta-Gdoutos MS, Shah SP. Carbon nanofiber cementitious composites: effect of debulking procedure on dispersion and reinforcing efficiency. *Cem. Concr. Comp.* Feb. 1, 2013;36; 25-32.

(56) References Cited

OTHER PUBLICATIONS

Tyson BM, Abu Al-Rub RK, Yazdanbakhsh A, Grasley Z. Carbon nanotubes and carbon nanofibers for enhancing the mechanical properties of nanocomposite cementitious materials. *J. Mater. Civil Eng.* 2011;23; 1028-1035.

Jiaxin Chen et al., "Influence of Multi-walled carbon nanotubes on the hydration products of ordinary Portland cement paste," Cement and Concrete Research 137 (2020) 106197.

Zou B, Chen SJ, Korayem AH, Collins F, Wang CM, Duan WH. Effect of ultrasonication energy on engineering properties of carbon nanotube reinforced cement pastes. *Carbon*. Apr. 1, 2015;85; 212-220.

Hamlin M. Jennings et al., "Characterization and Modeling of Pores and Surfaces in Cement Paste: Correlations to Processing and Properties," *Journal of Advanced Concrete Technology*, Feb. 2008, vol. 6, No. 1; pp. 5-29.

Huan He et al., "Modifying Mechanical Strength and Capillary Porosity of Portland Cement-Based Mortar Using a Biosurfactant from Pseudomonas fluorescens," Hindawi, Advances in *Materials Science and Engineering*, vol. 2020, Article ID 2948731; pp. 1-12. https://doi.org/10.1155/2020/2948931.

Zechuan Yu et al., "Mesoscopic packing of disk-like building blocks in calcium silicate hydrate," *Scientific Reports*, vol. 6, Article ID 36967; pp. 1-8. DOI: 10.1038/srep36967.

Ange-Therese Akono, "Fracture toughness of one-and two-dimensional nanoreinforced cement via scratch testing," Phil. Trans. R. Soc. A, vol. 379: 20200288; pp. 1-14. https://doi.org/10.1098/rsta.2020.0288.

Yu Hu et al., "Fracture toughness enhancement of cement paste with multi-walled carbon nanotubes," *Construction and Building Materials*, 2014. 70; pp. 332-338.

Zhifang Zhao et al., "A review on the properties, reinforcing effects, and commercialization of nanomaterials for cement-based materials," *Nanotechnology Reviews* 2020; 9: 303-322.

Cui, Xia, et al. "Mechanical properties and reinforcing mechanisms of cementitious composites with different types of multiwalled carbon nanotubes." *Composites Part A: Applied Science and Manufacturing* 103 (2017): 131-147.

Chuah, Samuel, et al. "Nano reinforced cement and concrete composites and new perspective from graphene oxide." *Construction and Building Materials* 73 (2014): 113-124.

Yang, Haibin, et al. "A critical review on research progress of graphene/cement based composites." *Composites Part A: Applied Science and Manufacturing* 102 (2017): 273-296.

The Non-Final Office Action issued on Mar. 23, 2023 for U.S. Appl. No. 17/376,426; pp. 1-36.

Maria del Carmen Camacho et al., "Mechanical Properties and Durability of CNT Cement Composites," *Materials* 2014, 7; pp. 1640-1651. Doi:10.3390/ma7031640.

C. Di Bella et al., "Application of microstructurally-designed mortars for studying early-age properties: Microstructure and mechanical properties," *Cement and Concrete Research* 78 (2015); pp. 234-244.

Maria S. Konsta-Gdoutos et al., "Self sensing carbon nanotube (CNT) and nanofiber (CNF) cementitious composites for real time damage assessment in smart structures," *Cement & Concrete Composites* 53 (2014); pp. 162-169.

Peter Stynoski et al., "Effects of silica additives on fracture properties of carbon nanotube and carbon fiber reinforced Portland cement mortar," *Cement & Concrete Composites* 55 (2015); pp. 232-240.

Matthieu Vandamme et al., "Nanogranular packing of C—S—H at substochiometric conditions," Cement & Concrete Research 40 (2010); pp. 14-26.

Qi Zhang et al., "Investigation of the structure of heated Portland cement paste by using various techniques," *Construction and Building Materials* 38 (2013); pp. 1040-1050.

Xiao-Lin Xie et al., "Dispersion and alignment of carbon nanotubes in polymer matrix: A review," *Materials Science and Engineering* R49 (2005); pp. 89-112.

Ange-Therese Akono, Supplementary material for "Fracture toughness of one-and two- dimensional nanoreinforced cement via scratch testing," *Phil. Trans. R. Soc.* doi: 10.1098/rsta[paper ID in form xxxx.xxxx e.g.-10.1098/rsta.2014.0049]; pp. 1-11.

G.Y. Li, P.M. Wang, X. Zhao, Mechanical behavior and microstructure of cement composites incorporating surface-treated multi-walled carbon nanotubes, Carbon N. Y. 43 (2005) 1239-1245. https://doi.org/10.1016/j.carbon.2004.12.017.

J.M. Makar, J. Margeson, J. Luh, Carbon nanotube/cement composites—early results and potential applications, *NRC Publ. Rec.* (2005) 1-10. https://doi.org/10.1039/B910216G.

G.Y. Li, P.M. Wang, X. Zhao, Pressure-sensitive properties and microstructure of carbon nanotube reinforced cement composites, *Cem. Concr. Compos.* 29 (2007) 377-382. https://doi.org/10.1016/j.cemconcomp.2006.12.011.

S. Musso, J.M. Tulliani, G. Ferro, A. Tagliaferro, Influence of carbon nanotubes structure on the mechanical behavior of cement composites, *Compos. Sci. Technol.* 69 (2009) 1985-1990. https://doi.org/10.1016/j.compscitech.2009.05.002.

J.M. Makar, G.W. Chan, Growth of cement hydration products on single-walled carbon nanotubes, *J. Am. Ceram. Soc.* 92 (2009) 1303-1310. https://doi.org/10.1111/j.1551-2916.2009.03055.x.

B. Han, X. Yu, E. Kwon, A self-sensing carbon nanotube/cement composite for traffic monitoring. *Nanotechnology*. 20 (2009) 445501. https://doi.org/10.1088/0957-4484/20/44/445501.

X. Yu, E. Kwon, A carbon nanotube/cement composite with piezoresistive properties, *Smart Mater. Struct.* 18 (2009). https://doi.org/10.1088/0964-1726/18/5/055010.

M.S. Konsta-Gdoutos, Z.S. Metaxa, S.P. Shah, Multi-scale mechanical and fracture characteristics and early-age strain capacity of high performance carbon nanotube/cement nanocomposites, *Cem. Concr. Compos.* 32 (2010) 110-115. https://doi.org/10.1016/j.cemconcomp.2009.10.007.

S.P. Shah, M.. Konsta-Gdoutos, Z.S. Metaxa, Exploration of fracture characteristics, nanoscale properties and nanostructure of cementitious matrices with carbon nanotubes and nanofibers, Proc. 7th Int. Conf. Fract. Mech. *Concr. Concr. Struct.* (2010) 9-12.

A. Chaipanich, T. Nochaiya, W. Wongkeo, P. Torkittikul, Compressive strength and microstructure of carbon nanotubes-fly ash cement composites, *Mater. Sci. Eng. A*. 527 (2010) 1063-1067. https://doi.org/10.1016/j.msea.2009.09.039.

M.S. Morsy, S.H. Alsayed, M. Aqel, Hybrid effect of carbon nanotube and nano-clay on physico-mechanical properties of cement mortar, *Constr. Build. Mater.* 25 (2011) 145-149. https://doi.org/10.1016/j.conbuildmat.2010.06.046.

D. Gao, M. Sturm, Y.L. Mo, Erratum: Electrical resistance of carbon-nanofiber concrete (Smart Mater. Struct. (2010) 18 (095039), *Smart Mater. Struct.* 20 (2011). https://doi.org/10.1088/0964-1726/20/4/049501.

T. Nochaiya, A. Chaipanich, Behavior of multi-walled carbon nanotubes on the porosity and microstructure of cement-based materials, *Appl. Surf. Sci.* 257 (2011) 1941-1945. https://doi.org/10.1016/j.apsusc.2010.09.030.

F. Collins, J. Lambert, W.H. Duan, The influences of admixtures on the dispersion, workability, and strength of carbon nanotube-OPC paste mixtures, *Cem. Concr. Compos.* 34 (2012) 201-207. https://doi.org/10.1016/j.cemconcomp.2011.09.013.

S. Kawashima, P. Hou, D.J. Corr, S.P. Shah, Modification of cement-based materials with nanoparticles, *Cem. Concr. Compos.* 36 (2013) 8-15.

B. Wang, Y. Han, S. Liu, Effect of highly dispersed carbon nanotubes on the flexural toughness of cement-based composites, *Constr. Build. Mater.* 46 (2013) 8-12. https://doi.org/10.1016/j.conbuildmat.2013.04.014.

B. Han, S. Sun, S. Ding, L. Zhang, X. Yu, J. Ou, Review of nanocarbon-engineered multifunctional cementitious composites, *Compos. Part A Appl. Sci. Manuf.* 70 (2015) 69-81. https://doi.org/10.1016/j.compositesa.2014.12.002.

S. Xu, J. Liu, Q. Li, Mechanical properties and microstructure of multi-walled carbon nanotube-reinforced cement paste, *Constr. Build. Mater.* 76 (2015) 16-23. https://doi.org/10.1016/j.conbuildmat.2014.11.049.

(56) References Cited

OTHER PUBLICATIONS

P.A. Danoglidis, M.S. Konsta-Gdoutos, E.E. Gdoutos, S.P. Shah, Strength, energy absorption capability and self-sensing properties of multifunctional carbon nanotube reinforced mortars, *Constr. Build. Mater.* 120 (2016) 265-274. https://doi.org/10.1016/j.conbuildmat.2016.05.049.

E.E. Gdoutos, M.S. Konsta-Gdoutos, P.A. Danoglidis, Portland cement mortar nanocomposites at low carbon nanotube and carbon nanofiber content: A fracture mechanics experimental study, *Cem. Concr. Compos.* 70 (2016) 110-118. https://doi.org/10.1016/j.cemconcomp.2016.03.010.

S.P. Tastani, M.S. Konsta-Gdoutos, S.J. Pantazopoulou, V. Balopoulos, The effect of carbon nanotubes and polypropylene fibers on bond of reinforcing bars in strain resilient cementitious composites, *Front. Struct. Civ. Eng.* 10 (2016) 214-223. https://doi.org/10.1007/s11709-016-0332-3.

G. Sun, R. Liang, Z. Lu, J. Zhang, Z. Li, Mechanism of cement/carbon nanotube composites with enhanced mechanical properties achieved by interfacial strengthening, *Constr. Build. Mater.* 115 (2016) 87-92. https://doi.org/10.1016/j.conbuildmat.2016.04.034.

Z.S. Metaxa, E.D. Pasiou, I. Dakanali, I. Stavrakas, D. Triantis, S.K. Kourkoulis, Carbon nanotube reinforced mortar as a sensor to monitor the structural integrity of restored marble epistyles under shear, *Procedia Struct. Integr.* 2 (2016.

K.M. Liew, M.F. Kai, L.W. Zhang, Carbon nanotube reinforced cementitious composites: An overview, Compos. Part A Appl. Sci. Manuf. 91 (2016) 301-323. https://doi.org/10.1016/j.compositesa.2016.10.020.

B. Balasubramaniam, K. Mondal, K. Ramasamy, G.S. Palani, N.R. Iyer, Hydration phenomena of functionalized carbon nanotubes (CNT)/cement composites, *Fibers.* 5 (2017) 1-13. https://doi.org/10.3390/fib5040039.

A. Sedaghatdoost, K. Behfarnia, Mechanical properties of Portland cement mortar containing multi-walled carbon nanotubes at elevated temperatures, *Constr. Build. Mater.* 176 (2018) 482-489. https://doi.org/10.1016/j.conbuildmat.2018.05.095.

Y. Ruan, B. Han, X. Yu, W. Zhang, D. Wang, Carbon nanotubes reinforced reactive powder concrete, Compos. Part A Appl. Sci. Manuf. 112 (2018) 371-382. https://doi.org/10.1016/j.compositesa.2018.06.025.

P. Sikora, M. Abd Elrahman, S.Y. Chung, K. Cendrowski, E. Mijowska, D. Stephan, Mechanical and microstructural properties of cement pastes containing carbon nanotubes and carbon nanotube-silica core-shell structures, exposed to elevated temperature, *Cem. Concr. Compos.* 95 (2019) 193-204. https://doi.org/10.1016/j.cemconcomp.2018.11.006.

B.R. Ahmed, A. Hussein, D. Saleh, R.S.M. Rashid, Influence of Carbon Nanotubes ( CNTs ) in the *Cement Composites*, (2019). https://doi.org/10.1088/1755-1315/357/1/012024.

T. Shi, Y. Gao, D.J. Corr, S.P. Shah, FTIR study on early-age hydration of carbon nanotubes-modified cement-based materials, *Adv. Cem. Res.* 31 (2019) 353-361. https://doi.org/10.1680/jadcr.16.00167.

M.O. Mohsen, M.S. Al Ansari, R. Taha, N. Al Nuaimi, A.A. Taqa, Carbon Nanotube Effect on the Ductility, Flexural Strength, and Permeability of *Concrete, J. Nanomater.* 2019 (2019) 1-11. https://doi.org/10.1155/2019/6490984.

G.M. Kim, I.W. Nam, B. Yang, H.N. Yoon, H.K. Lee, S. Park, Carbon nanotube (CNT) incorporated cementitious composites for functional construction materials: The state of the art, *Compos. Struct.* 227 (2019) 111244. https://doi.org/10.1016/j.compstruct.2019.111244.

Z. Li, D.J. Corr, B. Han, S.P. Shah, Investigating the effect of carbon nanotube on early age hydration of cementitious composites with isothermal calorimetry and Fourier transform infrared spectroscopy, *Cem. Concr. Compos.* (2020) 103513. https://doi.org/10.1016/j.cemconcomp.2020.103513.

\* cited by examiner

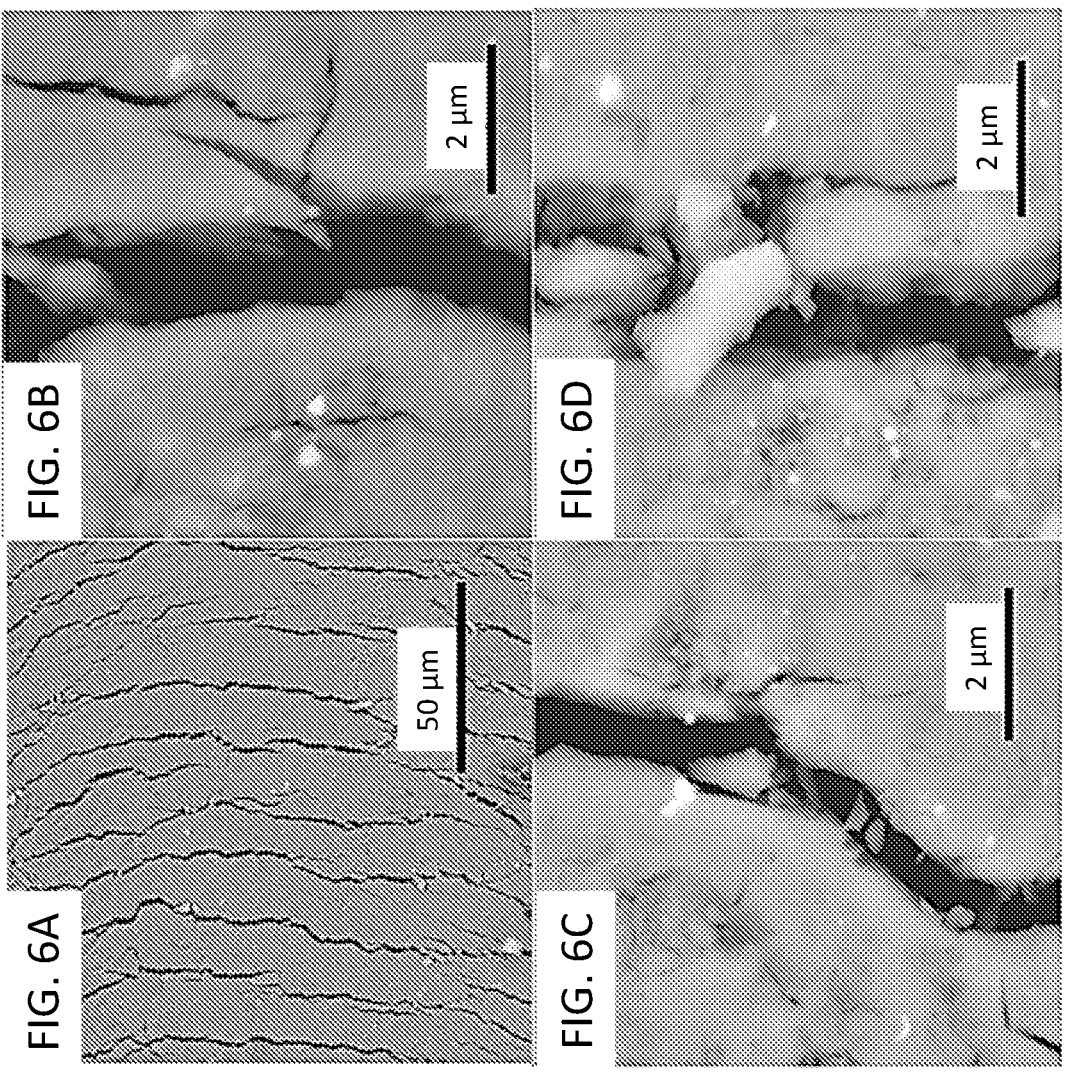

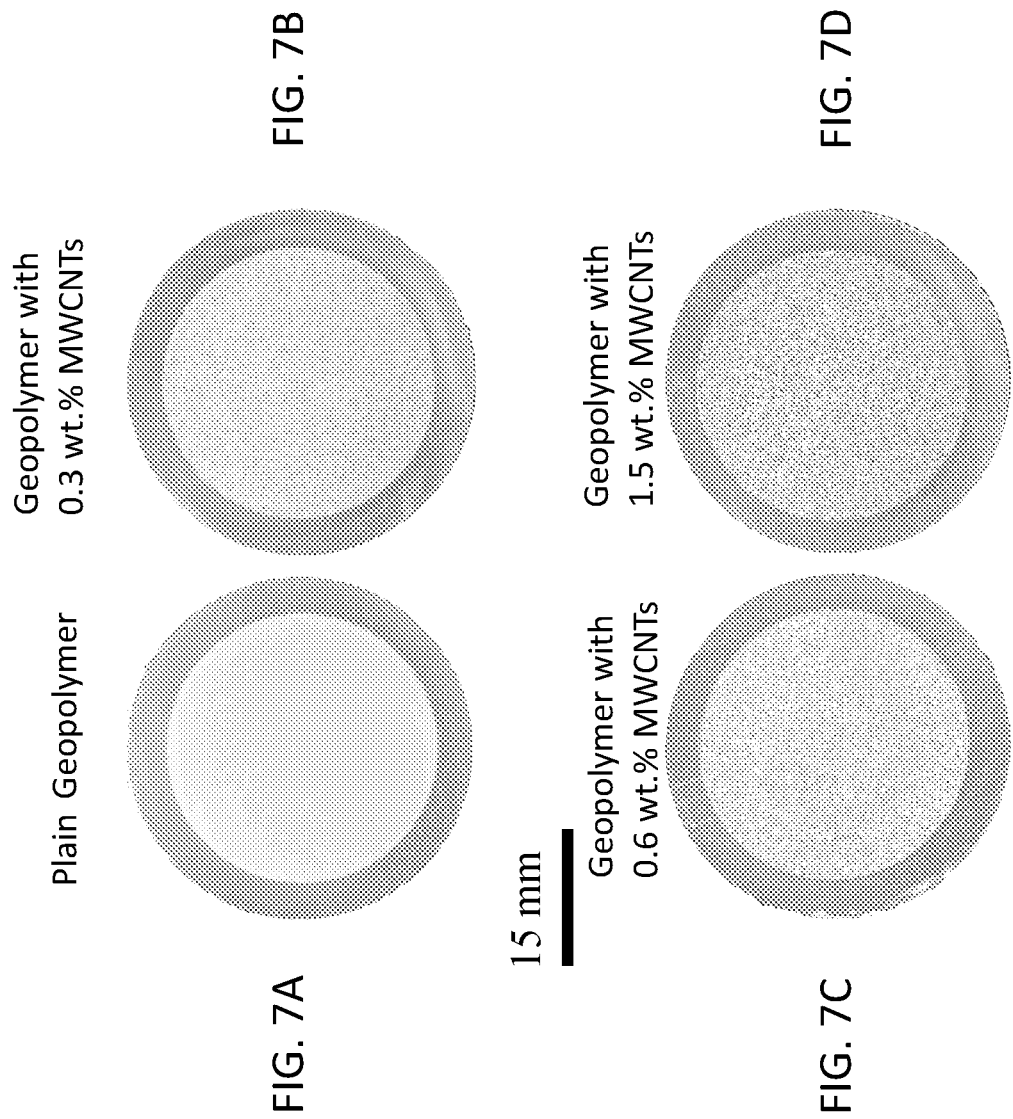

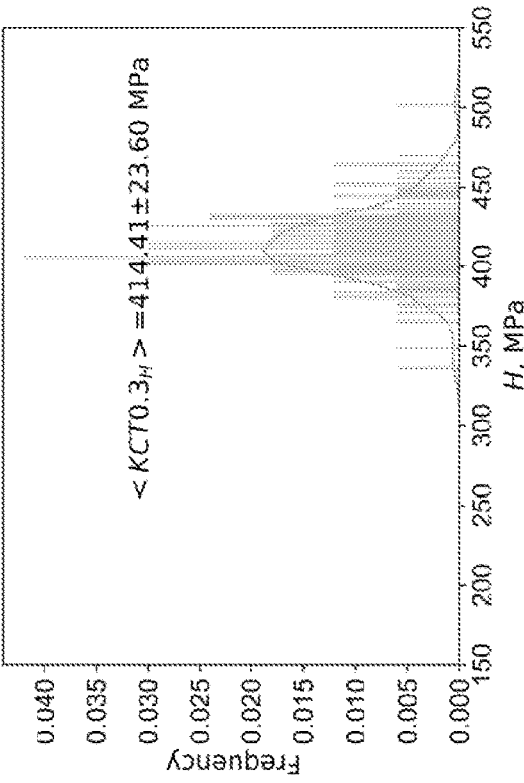
FIG. 18A
FIG. 18B
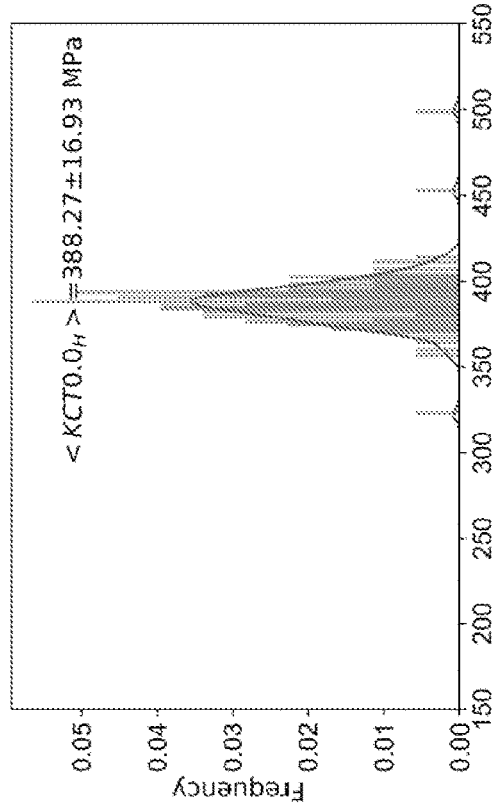
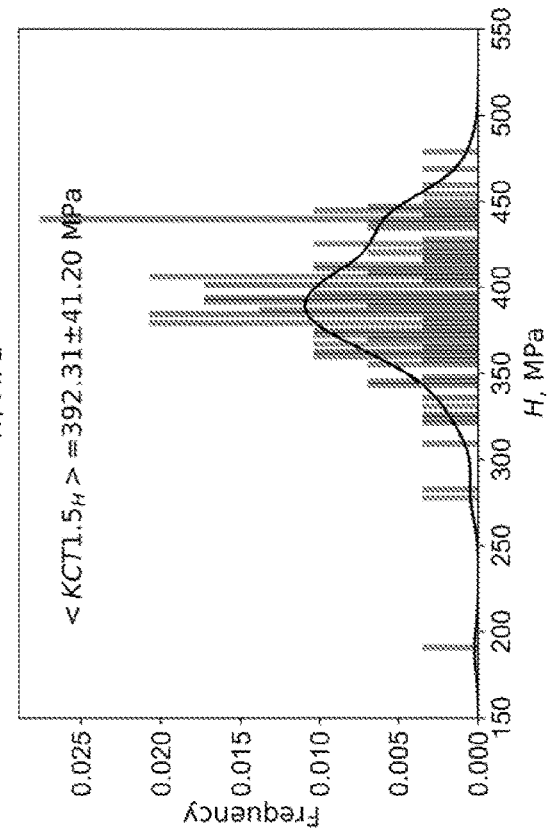
FIG. 18C
FIG. 18D
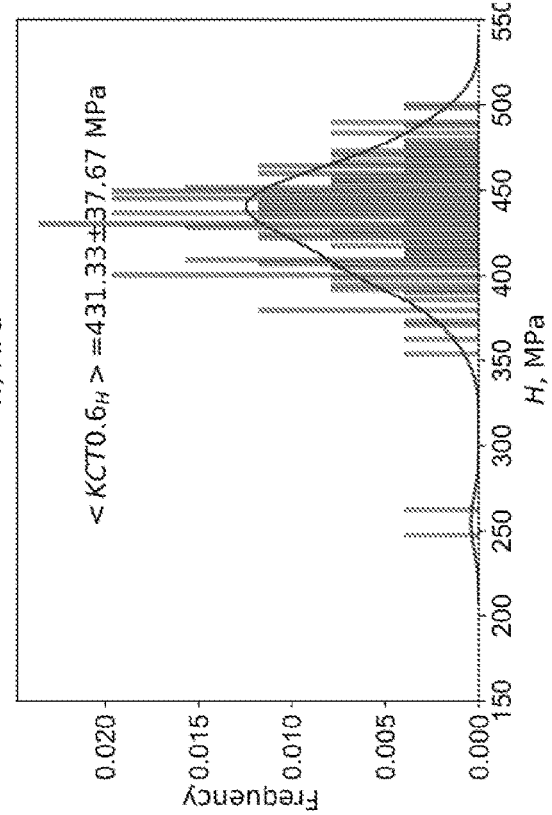

CARBON FIBER-REINFORCED METAKAOLIN-BASED GEOPOLYMER COMPOSITES

CROSS-REFERENCE TO RELATED APPLICATIONS

The present application is a National Stage of International Application No. PCT/US21/15651, filed Jan. 29, 2021, which claims priority to U.S. provisional patent application No. 62/967,142 that was filed Jan. 29, 2020, the entire contents of both of which are incorporated herein by reference.

REFERENCE TO GOVERNMENT RIGHTS

This invention was made with government support under 1727922 awarded by the National Science Foundation. The government has certain rights in the invention.

BACKGROUND

Geopolymers are amorphous aluminosilicate materials composed of cross-linked alumina $AlO_4$ and silica $SiO_2$ tetrahedra that form polysialates. Geopolymers have become popular as an eco-friendly alternative to cement, given their low carbon footprint. Based on their composition, geopolymers can be thought of as both ceramic and polymer materials. Metakaolin-based geopolymers generally have a faster setting time compared to ordinary Portland cement, and have excellent durability in extreme environments. In addition, metakaolin-based geopolymers show an excellent performance in terms of high compressive strength, low shrinkage, high acid resistance, high fire resistance, and low thermal conductivity. There are many potential applications of geopolymer composite materials such as alternative construction materials, 3-D printing applications, and smart and self-sensing structures. Potassium-based geopolymer composites have also been used for 3-D printing based on their specific rheological and mechanical properties.

In recent years, there has been a focus on geopolymer nanocomposites, which combine a high level of multifunctionality with good mechanical characteristics. An emerging class of nanomaterials for geopolymer nanocomposites are carbon-based nanomaterials, such as multi-walled carbon nanotubes (MWCNTs), due to their excellent thermal conductivity, enhanced fire performance, excellent strength, and light-weight characteristics. However, nanomaterial dispersion in geopolymers remains a challenge that drastically limits the performance of known geopolymer nanocomposites.

SUMMARY

CNF-reinforced geopolymer composites and MWCNT-reinforced geopolymer composites are provided. Methods of making the geopolymer composites are also provided.

One embodiment of a carbon nanotube-reinforced geopolymer composite includes: metakaolin-based geopolymer matrix; and multiwalled carbon nanotubes dispersed in the metakaolin-based geopolymer matrix, wherein the concentration of the multiwalled carbon nanotubes is in the range from 0.5 to 2 weight percent, per weight of metakaolin in the metakaolin-based geopolymer matrix. The carbon nanotube-reinforced geopolymer composite has a porosity of less than 7.5%, an indentation modulus of at least 7.0 GPa, and a fracture toughness of at least 0.57 MPa·sqrt(m).

One embodiment of a carbon nanofiber-reinforced geopolymer composite includes: a metakaolin-based geopolymer matrix; and carbon nanofibers having diameters in the range from 50 nm to 250 nm and lengths in the range from 50 μm to 500 μm dispersed in the metakaolin-based geopolymer matrix, wherein the concentration of the carbon nanofibers is in the range from 0.3 to 2 weight percent, per weight of metakaolin in the metakaolin-based geopolymer matrix. The carbon nanofiber-reinforced geopolymer composite has an indentation modulus of at least 9.0 GPa and a fracture toughness of at least 0.8 MPa·sqrt(m).

One embodiment of a method of making a carbon fiber-reinforced geopolymer composite includes the steps of: forming an aqueous dispersion of multiwalled carbon nanotubes, carbon nanofibers, or a combination thereof; ultrasonicating the aqueous dispersion; subsequently dissolving potassium hydroxide and silica in the aqueous dispersion to form a waterglass solution; adding metakaolin to the waterglass solution to form a geopolymer solution; mixing and degassing the geopolymer solution in a centrifugal mixer; and curing the geopolymer solution with continuous mixing to form the carbon fiber-reinforced geopolymer composite.

BRIEF DESCRIPTION OF THE DRAWINGS

Illustrative embodiments of the invention will hereafter be described with reference to the accompanying drawings.

FIG. 5A shows KGP. FIG. 5B shows KGP-0.5 wt. % CNF.

FIGS. 6A-6D show optical micrograph images of the fracture micromechanisms of the geopolymer nanocomposites of Example 1. FIGS. 6A-6B show KGP. FIG. 6C shows KGP-0.1 wt. % CNF. FIG. 6D shows KGP-0.5 wt. % CNF.

FIGS. 7A-7D show digital photos of geopolymer nanocomposites after the cold-mounting step: FIG. 7A shows KCT0.0; FIG. 7B shows KCT0.3; FIG. 7C shows KCT0.6; FIG. 7D shows KCT1.5.

FIG. 8A shows $FT/\sqrt{2pA}$ versus X for a scratch test on plain geopolymer KCT0.0. 2pA is the scratch probe shape function and X is the scratch path. The dashed horizontal line defines the fracture toughness Kc. FIG. 8B shows the scratch panorama of plain geopolymer KCT0.0.

(FIG. 14B) KCT0.3; (FIG. 14C) KCT0.6; (FIG. 14D) KCT1.5.

(FIG. 15A) KCT0.0; (FIG. 15B) KCT0.3; (FIG. 15C) KCT0.6; (FIG. 15D) KCT1.5.

(FIG. 16A) KCT0.0; (FIG. 16B) KCT0.3; (FIG. 16C) KCT0.6; (FIG. 16D) KCT1.5. Diamonds represent geopolymer with porous phase; circles represent main geopolymer phase; pentagons represent stronger phase; squares represent geopolymer with porous phase.

(FIG. 17A) KCT0.0; (FIG. 17B) KCT0.3; (FIG. 17C) KCT0.6; (FIG. 17D) KCT1.5. Plot displays the average number of fracture toughness $K_c$.

FIGS. 18A-18D show indentation hardness histograms: (FIG. 18A) KCT0.0; (FIG. 18B) KCT0.3; (FIG. 18C) KCT0.6; (FIG. 18D) KCT1.5.

DETAILED DESCRIPTION

Figure 1:
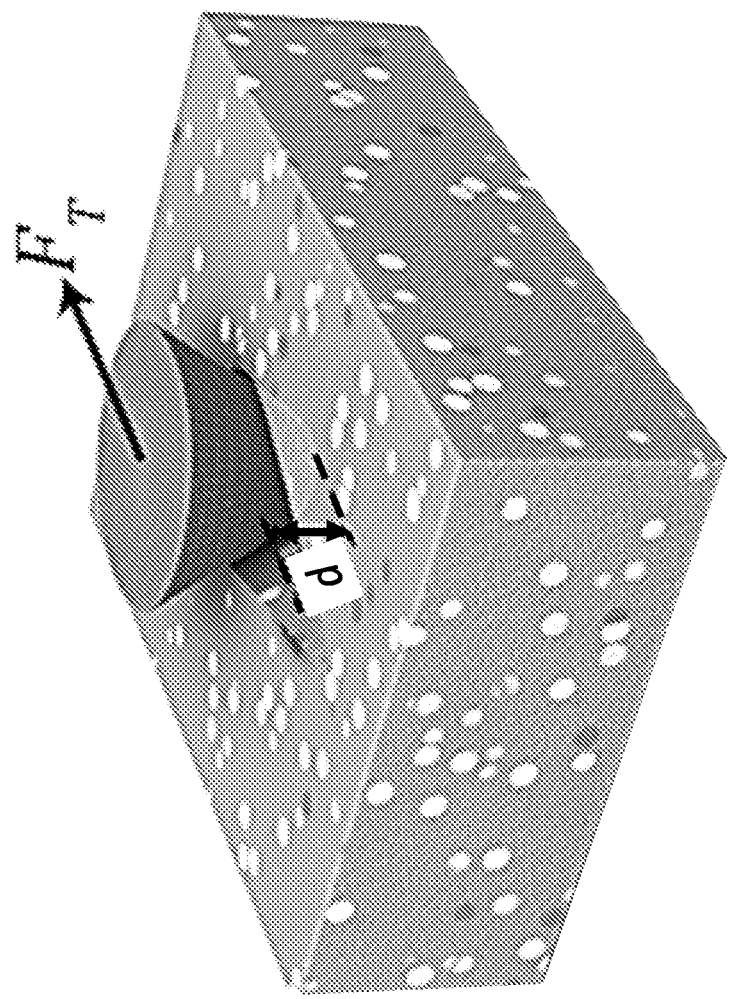
FIG. 1 shows a schematic of a scratch testing set-up.

Methods for making carbon-fiber reinforced geopolymer composites are provided. The methods produce metakaolin-based geopolymer composites in which carbon fibers, such as multiwalled carbon nanotubes and/or carbon nanofibers, are well dispersed in an metakaolin-based geopolymer matrix. As a result, various embodiments of the carbon-fiber reinforced geopolymer composites are characterized by high elastic moduli, high strength, and/or high fracture toughness.

The composites have uses in such applications as: the passive cooling of buildings in hot weather; affordable housing construction materials; fire-resistant structural elements; low-level nuclear waste encapsulation; and electrodes for clean energy generation. Concrete can be made by mixing the carbon-fiber reinforced geopolymer composite with aggregate. In the concrete, the carbon-fiber reinforced geopolymer composites acts as a paste coating on aggregate particles.

Without binding the inventions described herein to any particular theory of operation, the improved properties may be attributed, at least in part, to that ability of the highly dispersed carbon nanofibers and MWCNTs to promote the geopolymerization reaction, strengthen the geopolymer skeleton by promoting hydroxylation of silicon atoms, and/or reducing the mircoporosity of the composites.

One embodiment of a method for making a carbon-fiber reinforced geopolymer composite includes the steps of: (a) forming an aqueous dispersion of multiwalled carbon nanotubes (MWCNTs), carbon nanofibers (CNFs), or a mixture thereof; (b) dissolving sodium hydroxide, potassium hydroxide, or a mixture thereof, and fumed silica in the aqueous dispersion to form a waterglass solution; (c) adding metakaolin to the waterglass solution to form a geopolymer solution; (d) degassing the geopolymer solution under vacuum; and (e) curing the geopolymer solution to form carbon-fiber reinforced geopolymer composite comprising the MWCNTs and/or CNFs dispersed in a metakaolin-based geopolymer matrix.

A high degree of dispersion of the carbon fibers in the matrix material can be achieved by ultrasonicating the aqueous dispersion of carbon fibers prior to the addition of the sodium or potassium hydroxide, centrifugal mixing of the geopolymer solution, and continuously mixing the geopolymer solution using an orbital shaker during the cure. Geopolymer composites made using these mixing protocols can have high carbon fiber loadings and exception mechanical properties. The carbon fiber loadings can be measured per mass of the metakaolin in the geopolymer matrix. Various embodiments of the metakaolin-based geopolymer composites have carbon fiber (i.e., CNF and/or MWCNT) loadings in the range from 0.3 wt. % to 2.0 wt. %, per mass of metakaolin. This includes embodiments of the metakaolin-based geopolymer composites have CNF and/or MWCNT loadings in the range from 0.5 wt. % to 1.5 wt. %, per mass of metakaolin.

The carbon fibers used in the composites are referred to as nanomaterials because they have at least one nano-scale dimension, where a nano-scale dimension is a dimension (e.g., diameter and/or length) that is no greater than 1000 nm. Carbon fibers that can be used in the geopolymer composites include MWCNTs and CNFs. Carbon nanotubes (CNTs) are cylindrical tubes of $sp^2$ carbon having nano-scale diameters and relatively long length dimensions. For example, MWCNT having lengths of 100 nm or smaller and aspect ratios or at least 5, at least 10, or even higher can be used. MWCNTs are composed of two or more nested, concentric single-walled CNTs. Typically, MWCNTs have diameters that are no greater than 50 nm and, more commonly, no greater than 20 nm or no greater than 10 nm. By way of illustration, the MWCNTs can have diameters in the range from about 2 nm to about 10 nm. MWCNTs typically have lengths of 1 μm or greater, including lengths of at least 2 μm and at least 5 μm. By way of illustration, the MWCNTs can have lengths in the range from about 1 μm to about 10 μm. In a MWCNT sample, all or nearly all (e.g., >90%) of the MWCNTs may have dimensions falling into the above-recited ranges, and/or the average dimensions for the MWCNTs making up the sample may fall into the above-recited ranges.

CNFs are long filaments composed of stacked layers of graphene. The graphene in the CNFs may be in the form of, for example, stacked plates, cones, or cups. Typically, CNFs have diameters in the range from about 50 nm to about 250 nm, or greater, and lengths in the range from about 50 μm to about 500 μm, or longer. In a CNF sample, all or nearly all (e.g., >90%) of the CNFs may have dimensions falling into the above-recited ranges, and/or the average dimensions for the CNFs making up the sample may fall into the above-recited ranges.

To prepare the carbon fibers for incorporation into a geopolymer composite, they are dispersed in water to form an aqueous dispersion. The concentration of the carbon fibers in the dispersion should be selected to provide a carbon fiber-reinforced geopolymer composite having the intended carbon fiber loading, as illustrated in the Examples below.

The dispersion of the carbon fibers can be aided by the use of ultrasonic energy, which may be provided by a sonic horn, wherein higher sonication energies are generally used with higher carbon fiber concentrations. By way of illustration only, sonic energies in the range from about 5 kJ to about 100 kJ, including energies in the range from 8 kJ to 80 kJ, may be used. In order to avoid water evaporation during sonication, the dispersion can be cooled using, for example, an ice bath.

Once the carbon fibers are adequately dispersed, potassium hydroxide and/or sodium hydroxide and silica are dissolved in the aqueous dispersion of the carbon fibers. Fumed silica may be used. The alkali hydroxide (potassium and/or sodium) and the silica can be added sequentially or simultaneously. The resulting aqueous solution of potassium silicates, sodium silicates, or potassium and sodium silicates is referred to as a waterglass solution. The dissolution of the alkali hydroxides and the silica can be aided by agitating the solution. This can be accomplished by stirring, shaking, sonication, or a combination thereof. For example, an orbital shaker can be used to provide a continuous centrifugal motion, or a magnetic stir bar can be used to provide vigorous mixing. The solution is desirably agitated until full dissolution of the alkali hydroxide and silica has been achieved. The duration required for full dissolution will depend on the effectiveness of the mixing. By way of illustration, agitating the solution using an orbital shaker with an angular speed of about 100 rpm will generally achieve full dissolution in a period of about 24 hours, while the use of a magnetic stir bar with a rotation speed in the range from about 150 to 200 rpm may achieve full dissolution in a period of less than 24 hours. Because the dissolution process is exothermic, it is advantageous to add the alkali hydroxide and silica in small amounts and to cool the solution during dissolution.

Metakaolin is then added to the waterglass solution containing the dispersed carbon fibers where it undergoes polymerization reactions with the silica and alkali oxides to form the metakaolin-based geopolymer. Metakaolin is an aluminosilicate that can be formed by the calcination of kaolin at high temperatures (e.g., 650° C. to 800° C.). It is available as a high-purity, homogeneous synthetic material. Metakaolin is composed primarily of silica ($SiO_2$) and aluminum oxide ($Al_2O_3$), with variable contents of other oxides that are present in small amounts (e.g., less than about 10 wt. % and, more commonly, less than about 5 wt. %). These other oxides may include, for example, $Fe_2O_3$, $TiO_2$, MgO, CaO, $Na_2O$, and $K_2O$. Typically, metakaolin has a silica content in the range from about 40 wt. % to about 80 wt. % (including from about 45 wt. % to about 75 wt. %) and an aluminum oxide content in the range from about 10 wt. % to about 50 wt. % (including from about 15 wt. % to about 45 wt. %), with any balance being composed of other oxides and/or other impurities. The appropriate mass ratio of the metakaolin to the silica and alkali hydroxides will be determined by the stoichiometry of the geopolymer. Typically, then, the amount of metakaolin added will provide a silicon to aluminum ratio of about 2.

A slurry solution of the metakaolin-based geopolymer is formed during continuous mixing of the metakaolin with the waterglass solution via centrifugal mixing, followed by degassing under vacuum to defoam the resulting mixture to remove air. Generally, higher rotational mixing speeds and longer degassing periods will be used for higher carbon fiber concentration in the mixture, due to the increased viscosity of the mixture. By way of illustration only, in some embodiments of the methods, a mixing time of about 1 to about 5 minutes at a rotational mixing speed of about 1000 to about 1500 rpm, followed by a degassing time of about 1 to about 15 minutes at a rotational mixing speed of about 1200 to about 2000 rpm is used.

The geopolymer solution can then be cast as a film or as a layer or three-dimensional object with the use of a mold and then cured to form the carbon fiber-reinforced geopolymer composite. During the initial stage of molding, the mold should be covered with plastic to prevent moisture from escaping. During curing, the metakaolin reacts with the polysilicates of the waterglass to form polymers with Si—O—Al bonds, which are referred to as metakaolin-based geopolymers. Depending on the particular make-up of the waterglass and the metakaolin, the stoichiometry of the geopolymer may vary. Curing can be aided by heating and continuous agitation of the geopolymer slurry solution in an orbital shaker to remove air bubbles. Typical curing temperatures are in the range from about 30° C. to about 100° C., and typical curing times are in the range from about 24 hours to 5 days. However, temperatures and durations outside of these ranges can be used.

Notably, the geopolymer composites can be made without the use of organic surfactants and organic dispersing agents that promote the dispersion of the carbon fibers in water, such as polycarboxylates, carboxymethyl cellulose, and sodium dodecylsulfate, and the carbon fibers need not be treated to provide surface-functionalized with groups that promote dispersion in water, such as carboxyl functionalities. Some embodiments of the geopolymer composites consist of only the metakaolin-based geopolymer matrix and the carbon fibers dispersed therein.

The examples that follow illustrate methods of forming CNF-reinforced and MWCNT-reinforced geopolymer composites having reduced porosities and mechanical properties that are enhanced relative to their non-reinforced geopolymer counterparts. Mechanical properties that can be enhanced by the presence of well dispersed CNFs and MWCNTs include fracture toughness, indentation modulus, yield shear stress, and plastic modulus. By way of illustration, carbon-fiber reinforced geopolymer composites having CNF, MWCNT, or combined CNF and MWCNT loadings of at least 0.3 wt. % per mass of the metakaolin in the matrix and one or more of the following characteristics can be produced: porosities of less than 8%, including less than 7.5%, and further including porosities in the range from 5.5% to 7.3%; indentation moduli of at least 7.0 GPa or even at least 9.0 GPa, including indentation modulus in the range from 7.5 to 8.5 GPa and in the range from 9.0 to 10.5 GPa; fracture toughness of at least 0.57 MPa·sqrt(m) or even at least 0.80 MPa·sqrt(m), including fracture toughness in the range from 0.58 MPa·sqrt(m) to 0.65 MPa·sqrt(m) or in the range from 0.80 MPa·sqrt(m) to 0.90 MPa·sqrt(m); a plastic viscosity of at least 10 Pa·s; and a yield shear stress of at least 50 Pa.

Methods for measuring these and other properties of geopolymer composites are described in the examples. Unless otherwise indicated, for any measured values that are dependent upon temperature and/or pressure, the values recited for a given property refer to values at room temperature (23° C.) and standard atmospheric pressure.

EXAMPLES

Example 1: This Example Describes the Synthesis of a Metakaolin-Based Geopolymer Reinforced with Carbon Nanofibers Experimental Procedures
Materials Metakaolin-based potassium geopolymer (KGP) nanocomposites were manufactured of KGP-xCNF. Here, x represents the weight of the CNFs, based on the weight of the metakaolin. In the experiments reported below, CNF concentrations of 0; 0.3; 0.6; and 1.5 weight percent, per weight of metakaolin were studied. These weight fractions correspond to 0; 0.1; 0.2; and 0.5 weight percent, based on the total weight fraction of carbon nanofibers in the geopolymer composite. The reference geopolymer matrix, KGP, is the metakaolin-based potassium polysialate disoloxo of chemical formula $K_2O \cdot Al_2O_3 \cdot 4SiO_2 \cdot 11H_2O$. Highly graphitic, vapor-grown and tubular carbon nanofibers were used that were characterized by an average fiber diameter of 150 nm, a surface area of 20-30 $m^2/g$, and an average fiber length of 50-300 µm. Table 1 provides the manufacturer specifications for the carbon nanofibers used.

The manufacturing process occurred in three steps. First, the carbon nanofibers were dispersed in a surfactant using ultra-sonic energy. Second, the waterglass was synthesized by mixing deionized water, amorphous fumed silica, potassium hydroxide pellets, and dispersed carbon nanofibers. The waterglass solution was left to age for 24 hours under continuous stirring. Afterwards, synthetic metakaolin was added to the waterglass using centrifugal mixing followed by vacuum degassing. Metakaolin calcined at a temperature of 750° C., with an average particle sized of 1.2 µm and a specific surface area of 1.3 $m^2/g$ was used. After centrifugal mixing, the resulting geopolymer precursor slurry was cast into plastic molds and cured in an incubator at 50° C. for 24 hours under continuous stirring.

Grinding and Polishing

After synthesis, the geopolymer nanocomposite specimens were further processed for microscale mechanical characterization. The grinding and polishing included three steps. First, the specimens were embedded in a low-viscosity epoxy resin and machined in 5-mm thick slices using a low-speed diamond saw; the rigorously flat 5-mm thick slices were then glued onto circular aluminum discs using cyanoacrylate adhesive. Second, the specimens were ground in several steps using a semi-automated grinder and polisher along with silicon carbide pads of particle size 58.5 µm down to 8.4 µm. Third, the specimens were polished using polishing pads with a napped cloth along with polycrystalline diamond slurries of particle sizes 1 µm and 0.25 µm. The specimens were regularly cleansed using an inert oil-based solvent in an ultrasonic bath to prevent cross-contamination. The grinding and polishing procedure resulted in polished surfaces with a surface roughness of 56-122 nm, as assessed via surface profilometry. After grinding and polishing, the specimens were stored under vacuum.

TABLE 1

Characteristics of carbon nanofibers used as reinforcement in this study.

| Fiber diameter, nm | Surface area, $m^2/g$ | Length, µm | Modulus, Gpa | Strength, GPa |
|---|---|---|---|---|
| 150 | 20-30 | 50-200 | 600 | 8.7 |

Optical Microscopy and Scanning Electron Microscopy Analyses

The microstructure was observed using a Nikon high-resolution transmitted light optical microscope with a magnification of 200. Environmental scanning electron microscopy (ESEM) was employed to observe the failure mechanisms. ESEM was conducted on uncoated geopolymer nanocomposite specimens using an FEI Quanta 650 ESEM under low vacuum mode. In the tests, the accelerating voltage was 10.0 kV, the walking distance was 10.8 mm, and the magnification ranged from ×1,000 to ×20,000.

Microindentation Tests

In order to assess the mechanical behavior, microindentation tests were conducted using an Anton Paar Nanohardness Tester with a Berkovich diamond probe of tip radius 2 nm. Each indentation test was characterized by a maximum vertical force of 500 mN, a loading/unloading phase of 30 s and a holding phase of 10 s. A 11×11 grid of indent was carried out per specimen, spanning an area of 1 $mm^2$. During each test, the vertical load P and the penetration depth h were continuously recorded at a frequency of 45 kHz using force and depth sensors with a resolution of 0.3 nN for the load and 0.06 nm for the penetration depth. The indentation modulus M and the indentation hardness H were computed from the force and depth measurements by application of the Oliver & Pharr's model: (Oliver, W. C. et al., 1992. Journal of materials research, 7(6), pp. 1564-1583.)

$$M = \frac{\sqrt{\pi}}{2} \frac{S}{\sqrt{A}}; H = \frac{P_{max}}{A} \qquad (1)$$

where S is the stiffness of the vertical force-penetration depth curve upon unloading, $P_{max}$ is the maximum vertical force, and A is the contact area at maximum depth. Prior to indentation testing, the contact area function was calibrated using fused silica as a reference material.

Microscopic Scratch Tests

The fracture response was assessed using microscopic scratch tests. As illustrated in FIG. 1, the scratch test consisted of pushing a hard probe across the surface of the material under a linearly increasing load. In the tests, a Rockwell probe was used, characterized by a half-apex angle of 60° and a tip radius of R=200 µm. Each scratch test was characterized by a prescribed maximum vertical force of 5.5 N, a scratch length of 3 mm, and a scratch speed of 6 mm/min. The vertical force was prescribed using a closed-feedback loop, whereas the forces and penetration depth were recorded using high-accuracy transducers with a resolution of 1 mN for the forces and 3 nm for the penetration depth.

A nonlinear fracture mechanics model was applied to compute the fracture toughness $K_c$ from the measurements of the horizontal force $F_T$ and the penetration depth d: (Ange-Therese Akono et al., Physical Review Letters, Vol. 106, pp. 204302, (2011); and Ange-Therese Akono et al., Journal of the Mechanics and Physics of Solids, Vol. 60, pages 379-390, (2012).)

$$K_c = \frac{F_T}{\sqrt{2pA_{LB}}} \qquad (2)$$

where p is the perimeter and $A_{LB}$ is the horizontally projected load-bearing contact area. $2pA_{LB}$ is the shape function of the material that varies with the probe geometry and the penetration depth d. For instance, in the case of a spherical probe of radius R, the shape probe function is a quadratic function of the depth according to: $2pA_{LB}=\alpha(d/R)^2$, where $\alpha$ is calibrated using a reference material. (Ange-Therese Akono et al., Journal of Materials Research, Vol. 27, pp. 485-493, (2012); and Ange-Therese Akono et al., Wear, Vol. 313, pp. 117-124, (2014).)

Results

Elasto-Plastic Behavior

Figure 2:
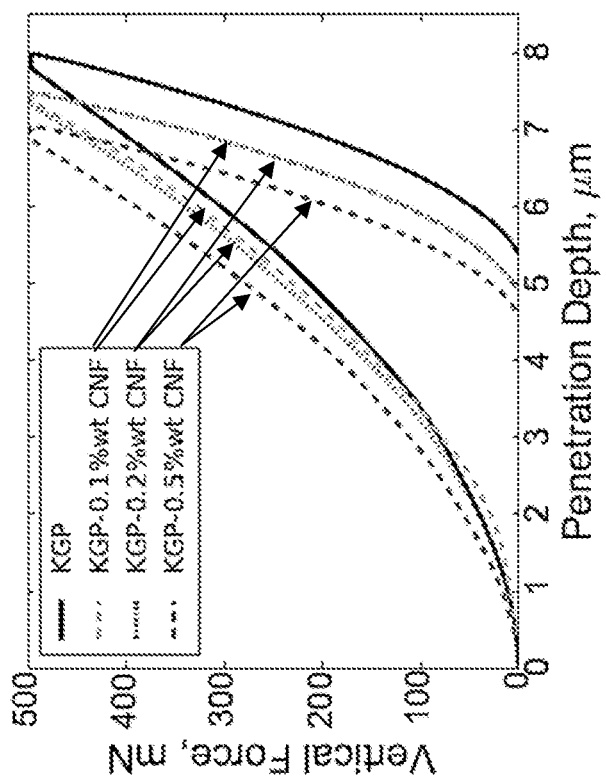
FIG. 2 shows representative indentation curves for the geopolymer nanocomposites of Example 1.

FIG. 2 displays representative indentation curves for the materials studied. The microindentation test in pure geopolymer, KGP, resulted in a maximum penetration depth of 7989 nm, whereas the tests in geopolymer nanocomposites resulted in maximum penetration depths of 7493 nm, 7485 nm, and 7056 nm, corresponding respectively to weight fractions of carbon nanofibers 0.1%, 0.2%, and 0.5%. Thus, the maximum penetration depth decreased as the weight fraction of carbon nanofiber reinforcement increased, pointing to a beneficial effect of carbon nanofibers on the mechanical performance. Moreover, for all materials, the maximum penetration depth was more than an order of magnitude higher than the surface roughness, supporting the accuracy of the mechanical assessment approach.

Table 2 gives the average values of the indentation modulus M and of the indentation hardness H; for each material, 121 tests were conducted. Pure geopolymer exhibited an indentation modulus of 8.30±0.25 GPa, and an indentation hardness of 430.43±23.34 MPa. Assuming a Poisson's ratio of v=0.2 for pure geopolymer, the tests yielded an elastic modulus of 7.96±0.24 GPa for pure geopolymer.

TABLE 2

Influence of carbon nanofiber content on the indentation modulus (M) and of the indentation hardness (H) of metakaolin-based potassium geopolymer nanocomposites. 121 indentation tests were conducted for each material.

|  | M, GPa | H, MPa |
| --- | --- | --- |
| KGP | 8.30 ± 0.25 | 430.43 ± 23.34 |
| KGP-0.1 wt. % CNF | 8.69 ± 0.35 | 470.87 ± 20.44 |
| KGP-0.2 wt. % CNF | 9.41 ± 0.36 | 506.86 ± 32.92 |
| KGP-0.5 wt. % CNF | 10.04 ± 0.32 | 538.05 ± 31.33 |

The addition of carbon nanofibers led to an enhancement of the elasto-plastic properties. The indentation modulus (M) and indentation hardness (H) of KGP-0.1 wt. % CNF was respectively 5% and 9% greater than those of pure geopolymer. Moreover, adding 0.2 wt. % of carbon nanofibers resulted in an increase of 13% in M and 18% in H. Finally, adding 0.5 wt. % of carbon nanofibers resulted in an increase of 21% in M and 25% in H. Overall, greater gains were observed in the indentation hardness due to the presence of carbon nanofibers. Nonetheless, carbon nanofibers resulted in an overall increase in both the modulus and the strength.

Fracture Response

Figure 3:
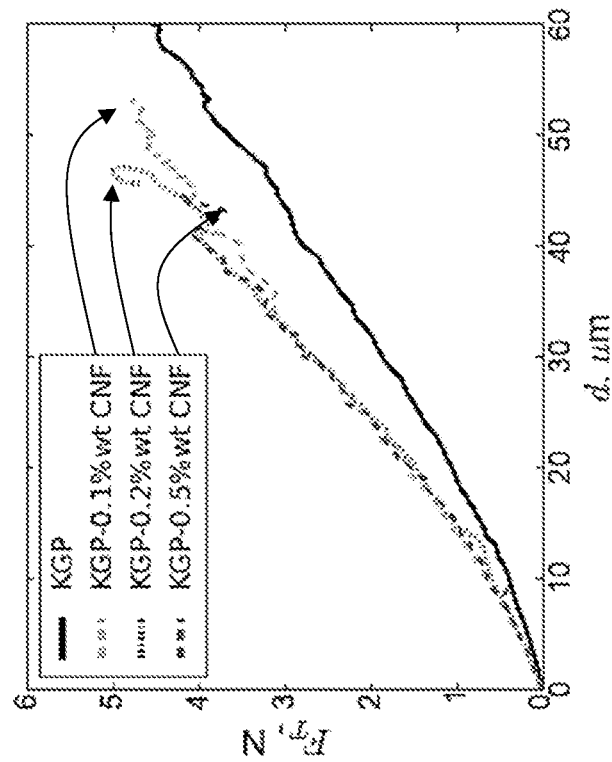
FIG. 3 shows representative scratch curves for the geopolymer nanocomposites of Example 1.

FIG. 3 investigates the influence of carbon nanofibers on the scratch response. For pure geopolymer, the maximum penetration depth was 60.90 μm. Meanwhile, for geopolymer nanocomposites, the maximum penetration depths were 53.34 μm, 45.75 μm, and 45.07 μm, corresponding respectively to KGP-0.1 wt. % CNF, KGP-0.2 wt. % CNF, and KGP-0.5 wt. % CNF. Thus, the addition of carbon nanofibers led to significant reduction in the maximum penetration depth during scratch testing.

Figure 4:
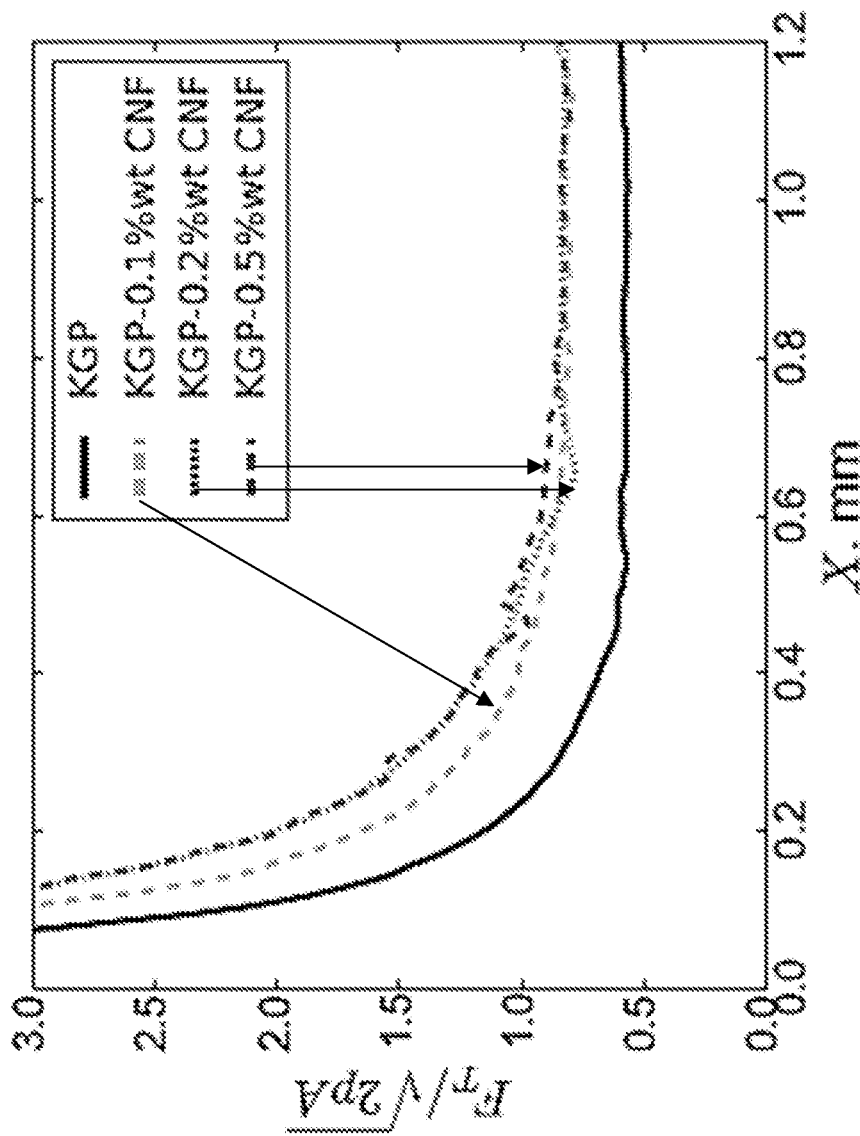
FIG. 4 shows representative scratch toughness curves for the pure geopolymer and geopolymer nanocomposites of Example 1.

FIG. 4 displays the quantity $F_T/\sqrt{2pA}$ as a function of the scratch path, X, for the geopolymer nanocomposites studied. $F_T$ is the horizontal force and 2pA is the probe shape function. In order to apply the scratch fracture model for a spherical probe, penetration depths less than 27 μm were selected, to remain within the spherical range of the Rockwell C scratch probe. For all materials, the quantity $F_T/\sqrt{2pA}$ converged for large values of X (and large values of the penetration depth d) towards a constant. This convergence reflects a transition from ductile processes to brittle energy dissipation processes at large penetration depths. In the brittle regime, the fracture toughness is given by the asymptotic value of the function $F_T/\sqrt{2pA}$.

Table 3 displays the values of the fracture toughness $K_c$ and of the fracture energy $G_f$ for pure geopolymer and for KGP×CNF hybrids. The fracture energy was computed using the Griffith-Irwin equation $G_f=K_c^2/M$. The fracture toughness $K_c$ of pure geopolymer was 0.60±0.02 MPa√m and the corresponding fracture energy $G_f$ was 43.4 J/m².

TABLE 3

Influence of carbon nanofiber content on fracture toughness (Kc) of metakaolin-based potassium geopolymer nanocomposites, 7-8 scratch tests were conducted for each material.

|  | $K_C$, MPa, √m | Fracture Energy J/m² |
| --- | --- | --- |
| KGP | 0.60 ± 0.02 | 43.4 |
| KGP-0.1 wt.% CNF | 0.83 ± 0.02 | 79.3 |
| KGP-0.2 wt.% CNF | 0.84 ± 0.02 | 74.5 |
| KGP-0.5 wt.% CNF | 0.87 ± 0.02 | 75.4 |

Carbon nanofibers contributed to a toughening of the geopolymer matrix. The fracture toughness $K_c$ increased by 38%, 40%, and 25%, for KGP-0.1 wt. % CNF, KGP-0.2 wt. % CNF, and KGP-0.5 wt. % CNF, respectively. The fracture energy was enhanced by 83%, 72%, and 74%, respectively, for KGP-0.1 wt. % CNF, KGP-0.2 wt. % CNF, and KGP-0.5 wt. % CNF. This gain in toughness and fracture energy is significant and much larger than the observed gains in elastic modulus and indentation hardness.

Densification of Geopolymer Matrix Due to Carbon Nanofibers

Figures 5A, 5B:
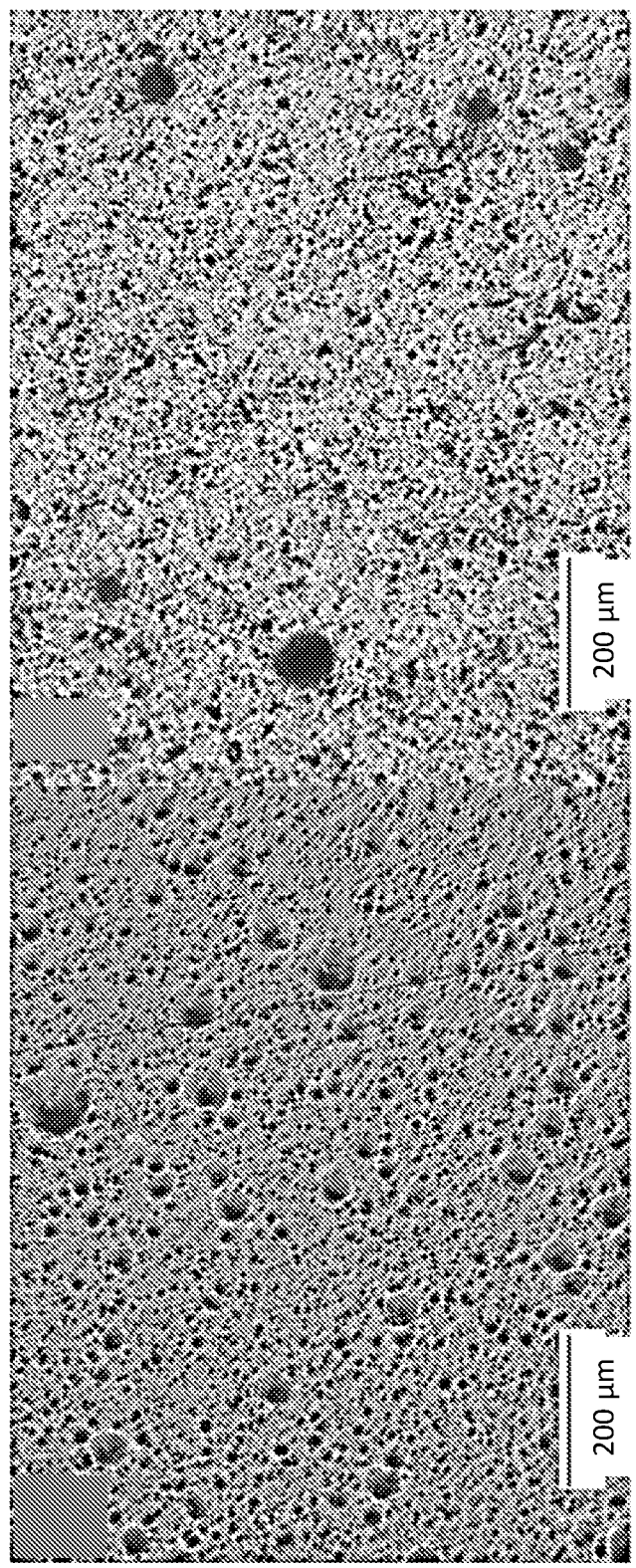
FIGS. 5A-5B show optical micrograph images of the microstructure of the pure geopolymer and the nanocomposite geopolymer of Example 1.

An important mechanism for both strengthening and toughening is carbon nanofiber-induced densification. FIGS. 5A-5B display optical microscopy images for pure geopolymer, KGP, and KGP-0.5 wt. % CNF. Pure geopolymer exhibited a homogeneous and three-dimensional porous microstructure with the pore diameter ranging from ~7 μm to ~47 μm. In contrast, KGP-0.5 wt. % CNF showed an absence of micropores with a diameter less than 30 μm and a sharp reduction in the total fraction of air voids. Yet, a couple of spare air voids could be seen, with the pore diameter ranging from 37 μm to 77 μm. Thus, two competing trends were observed: (i) a reduction in the fraction of micropores, and (ii) an increase in the macropore size. The former trend can be explained by the seeded nucleation effect: nanofibers act as heterointerfaces that promote geopolymerization along carbon nanofiber surfaces. The latter trend, increase in the size of macropores, is due to the increase in viscosity for geopolymer nanocomposite precursor paste. This increase in viscosity increases the presence of macropores even after employing advanced mixing methods such as centrifuge mixing and vacuum degassing. Thus, the presence of carbon nanofibers resulted in a reduction of the overall porosity. Classical models for ceramics have linked the elasticity and strength to the total porosity.

Fracture Micromechanisms

Another important toughening mechanism is carbon nanofiber bridging. FIGS. 6A-6D display the fracture micromechanisms during scratch testing of pure geopolymer and of geopolymer nanocomposites. FIG. 6A displays the presence of curved cracks visible in the residual scratch groove:

these cracks point to the predominance of brittle fracture processes at large penetration depths. FIGS. 6B-6D compare representative fractures for pure geopolymer, KGP-0.1 wt. % CNF, and KGP-0.5 wt. % CNF. For pure geopolymer, the fracture was unobstructed with an average crack width of 1.0 μm. In contrast, for carbon nanofiber-reinforced geopolymers, see FIGS. 6C-6D, ligament bridging was observed, leading to reduced fracture widths, with an average crack width of 0.8 μm for KGP-0.1 wt. % CNF and of 0.6 μm for KGP-0.5 wt. % CNF.

Water Absorption and Porosity Measurements

The water absorption and the porosity were measured after 24 hours of curing following the standard ASTM C20-00 with minor modifications, as described below. (ASTM C20-00(2015), Standard Test Methods for Apparent Porosity, Water Absorption, Apparent Specific Gravity, and Bulk Density of Burned Refractory Brick and Shapes by Boiling Water, ASTM International, West Conshohocken, PA, 2015, www.astm.org) First, the specimens were dried, and the dry mass $M_{dry}$ and dry specific gravity $\rho_{dry}$ were measured. Then, the specimens were saturated by submersion in deionized water at 23° C. for 48 hours, and the saturated mass was measured $M_{saturated}$. The water absorption, W, was calculated as the relative difference between the dry and the saturated mass:

$$W = \frac{M_{saturated} - M_{dry}}{M_{dry}} \times 100 \quad (1)$$

The porosity, P, was computed as the product of the water absorption and the dry specific gravity:

$$P = W \times \rho_{dry} \quad (2)$$

(Théréné F, Keita E, Nael-Redolfi J, Boustingorry P, Bonafous L, Roussel N. 2020. Water absorption of recycled aggregates: Measurements, influence of temperature and practical consequences. *Cem. Concr. Res.* 137.106196-106204.)

A porosity of 7% for KGP+0.6 wt % CNF and 4% for KGP+1.5 wt % CNF, see Table 1 below.

| Porosity Table: Porosity measurements for carbon nanofiber-reinforced geopolymers. | | | |
|---|---|---|---|
| Specimen | Dry density (g/cc) | Water absorption (%) | Porosity (%) |
| KGP + 0.6 wt % CNF | 1.37 | 5.12 | 7.04 |
| KGP + 1.5 wt % CNF | 1.46 | 2.95 | 4.30 |

Conclusions

The mechanical performance of metakaolin-based polysialate disiloxo nanocomposites with 0.1 wt. %, 0.2 wt. %, and 0.5 wt. % of carbon nanofibers was investigated. The elasto-plastic behavior and fracture behavior were characterized via microindentation and microscopic scratch tests. These are the major findings:

Carbon nanofibers result in an increase in indentation modulus and indentation hardness. The indentation modulus (M) and indentation hardness (H) of KGP-0.1 wt. % CNF was respectively 5% and 9% greater than those of pure geopolymer. Moreover, adding 0.2 wt. % of carbon nanofibers resulted in an increase of 13% in M and 18% in H. Finally, adding 0.5 wt. % of carbon nanofibers resulted in an increase of 21% in M and 25% in H.

Carbon nanofibers lead to an increase in fracture toughness and fracture energy. The fracture toughness $K_c$ increased by 38%, 40%, and 25%, respectively, for 0.1 wt. % CNF, 0.2 wt. % CNF, and 0.5 wt. % CNF. The fracture energy was enhanced by 83%, 72%, and 74%, respectively, for 0.1 wt. % CNF, 0.2 wt. % CNF, and 0.5 wt. % CNF.

Carbon nanofibers lead to a densification of the geopolymer matrix and a reduction of micropores less than 30 μm.

Carbon nanofibers give rise to crack bridging mechanisms.

Example 2: This Example Describes the Synthesis of a Metakaolin-Based Geopolymer Reinforced with Multiwalled Carbon Nanotubes Materials and Methods Materials The chemical composition of the reference geopolymer was $K_2O \cdot Al_2O_3 \cdot 4SiO_2 \cdot 11H_2O$. To synthesize metakaolin-based potassium geopolymer nanocomposites, potassium hydroxide, silica fume, deionized water, and metakaolin were used, along with MWCNTs. The fume silica had a particle size of 70 nm and a surface area of 300 m²/g. The MWCNTs had an outer diameter <8 nm and an inner diameter of 2-5 nm, a length of 10-30 μm, and a specific surface area of 500 m²/g. Four types of geopolymer nanocomposites were manufactured as shown in Table 4. The plain geopolymer without MWCNTs is named KCT0.0. The geopolymer nanocomposites reinforced with 0.3 wt. %, 0.6 wt. %, and 1.5 wt. % MWCNTs per mass of metakaolin are named KCT0.3, KCT0.6, and KCT1.5, respectively.

The nomenclature list below introduces the mathematical notations used in this example.

| Nomenclature | |
|---|---|
| Symbol | Physical Meaning |
| Ac | Contact Area |
| $F_T$ | Horizontal Force |
| Y | Shear Rate |
| H | Indentation Hardness |
| h | Indentation Depth |
| Kc | Fracture Toughness |
| M | Indentation Modulus |
| MWCNTs | Multi-walled Carbon Nanotubes |
| μ | Mean |
| $\eta_p$ | Plastic Viscosity |
| P | Vertical Force |
| φ | Porosity |
| $R^2$ | Coefficient of Determination |
| s | Standard Derivation |
| S | Indentation Stiffness |
| $\tau_0$ | Yield Shear Stress |
| τ | Shear Stress |

Table 4. Mix design of MWCNT-reinforced geopolymer per 100 g of specimen. KCT0.0 represents plain geopolymer; KCT0.3, KCT0.6, KCT1.5 represent geopolymer reinforced with 0.3 wt. % MWCNTs, 0.6 wt. % MWCNTs, 1.5 wt. % MWCNTs, respectively, per weight of metakaolin. For all mix designs, 18.43 g of fume silica, 19.87 g of potassium hydroxide, 27.61 g of water, and 34.08 g of metakaolin were used per 100 g of specimen.

| Sample Name | Concentration (wt %) | MWCNT (g) |
|---|---|---|
| KCT0.0 | 0.00 | 0.00 |
| KCT0.3 | 0.29 | 0.10 |

| Sample Name | Concentration (wt %) | MWCNT (g) |
|---|---|---|
| KCT0.6 | 0.58 | 0.20 |
| KCT1.5 | 1.47 | 0.50 |

To synthesize geopolymer nanocomposites, three main steps were used. The first step was to pre-disperse MWCNTs in 27.61 g of deionized water using the ultrasonic energy provided by a VCX 750 ultrasonic horn. The dispersion energy was 2.8975 kJ per grams of MWCNTs, and per mL of deionized water. The dispersion energy was proportional to the amount of MWCNTs. 8 kJ, 16 kJ, 40 kJ were used for KCT0.3, KCT0.6, and KCT1.5, respectively. To reduce the heat generated by the concentrated dispersion energy, an ice bath was implemented. The MWCNTs were further dispersed in the following two steps. The next step was to produce potassium silicate solution. The well-dispersed MWCNTs suspension was mixed with 19.87 g of potassium hydroxide and 18.43 g of fumed silica until a uniform viscous solution was produced. The final solution continued to be mixed on a 3-mm orbital shaker at a rotational speed of 100 rpm, at room temperature for 24 hours. The continuous stirring under the orbital shaker was used to prevent MWCNT agglomeration and sedimentation within the potassium silicate solution. The final step was to manufacture geopolymer nanocomposites by mixing the potassium silicate solution with metakaolin using a planetary centrifugal mixer, THINKY ARE 310. The mixing occurred in two stages. The first stage was centrifugal mixing at 1200 rpm for 3 minutes. The second stage was vacuum degassing. Proportional parameters for different concentration levels were used to account for the MWCNT-induced increase in viscosity of the MWCNT-reinforced geopolymer slurry. The selected vacuum degassing speed and time were 1400 rpm for 3 minutes for KCT0.0 and KCT0.3, 1600 rpm for 5 minutes for KCT0.6, and 1800 rpm for 10 minutes for KCT1.5. The geopolymer slurries were then poured into 30-mm diameter cylindrical molds and sealed with plastic wraps. The specimens were cured in a 19-mm orbital shaker at a rotational speed of 150 rpm and under a temperature of 50° C. for 24 hours. Digital photographs of the specimens are shown in FIGS. 7A-7D.

Rheology Characterization

In order to characterize the rheology of the fresh geopolymer slurries, an Anton Paar Modular Compact Rheometer was used, equipped a plate-plate system with a plate diameter of 24.98 mm. The measured distance was 0.25 mm and the measuring temperature was 25±0.05° C. Flow curves in a shear rate ranging from 1 to 100 1/s were measured in 17 constant logarithmically-spaced steps with a time delay of 5 seconds between successive measurements. The modified Bingham Model (MBM) was implemented to fit the shear stress and shear rate curves as shown in Eq. 1 due to the non-Newtonian nature of fresh geopolymer nanocomposites: $\tau$ is the shear stress, $\gamma$ is the shear rate, and c is a constant. Meanwhile, yield shear stress $\tau_0$ and plastic viscosity $\eta_P$ are the rheology characteristics.

$$\tau = \tau_0 + \eta_P \cdot \gamma + c\gamma^2 \quad (3)$$

The rheology parameters yield shear stress $\tau_0$ and plastic viscosity $\eta_P$, were determined through nonlinear fitting of Eq. (2) using the Python computer programming language. (Chougan M et al., (2020) Constr Build Mater 250:118928. https://doi.org/10.1016/j.conbuildmat.2020.118928.)

X-Ray Diffraction and Fourier-Transform Infrared Spectroscopy

XRPD was used to characterize the influence of MWCNTs on the chemistry of geopolymer nanocomposites. Prior to testing, the samples were milled with ethanol using a McCrone mill to generate a powder of uniform fineness, less than 44 µm. XRPD tests were conducted using a Smartlab Gen2 3 kW X-ray diffractometer of 40 keV accessible energy and a 30 mA current, with a Bragg angle 2θ in the range 10° to 90°. The step size was 0.05°. FTIR was performed using a Nicolet iS50 spectrometer (Thermo Nicolet) at the NUANCE Keck-II facility. The powder specimens were prepared using the same method as for XRPD analysis. In addition, KBr pellets were prepared by pressing the mixture of specimen powder and KBr with a powder:KBr weight ratio of 1:100. Regular adsorption-transmission mode was used with a frequency range from 4000 to 400 $cm^{-1}$, at a resolution of 4 $cm^{-1}$, and using an average of 64 scans. Statistical deconvolution was applied on the FTIR results using the Python computer programming language. (Chen X, et al. (2020) J Sol-Gel Sci Technol. https://doi.org/10.1007/s10971-020-05360-6.)

Grinding and Polishing

In order to perform microscopic testing such as scratch tests and indentation tests, a rigorous specimen preparation procedure was implemented to yield a low surface roughness. The cured geopolymers were cold mounted using a low-viscosity epoxy resin in 35-mm diameter cylindrical molds. A high precision low-speed saw with a diamond blade was utilized to generate 5-mm thick cylindrical slices. The slices were mounted onto 35-mm diameter aluminum disks. Digital photography images of the four types of geopolymer nanocomposites are shown in FIGS. 7A-7D. The mounted specimens were then ground and polished using a semi-automated grinder/polisher. Grinding was accomplished using silicon carbide abrasives of different grit sizes, consecutively 400, 600, and 1200 grit. Afterward, specimens were polished using synthetic long-napped rayon cloths with diamond suspensions of particle size 3 µm, 1 µm, and 0.05 µm. In between each step, the specimens were rinsed in an oil-based solution using an ultrasonic bath for 2 minutes to avoid contamination. The polished specimens were stored in a vacuum desiccator at room temperature.

Microscopic Image Analysis

Optical microscopy imaging was conducted using a Nikon high-resolution microscope. Afterward, the optical microscopy images were processed through digital image analysis to yield the meso-porosity. The image size was 1026 µm in width and 821 µm in height. Four images at different locations were used to get the average porosity.

Scratch Testing

Scratch testing was utilized to evaluate the fracture behavior of geopolymer nanocomposites at the microscopic length-scale. Scratch testing entails pulling a hard probe across the surface of the material under a prescribed linear vertical force. An Anton Paar microscopic scratch tester (Ashland, VA) was used, equipped with a 200-µm Rockwell C diamond probe. For each type of geopolymer nanocomposites, 11 scratch tests were performed, each test being characterized by a length of 3 mm, a scratch speed of 6 mm/min, and a maximum vertical force of 5.5 N. The microscopic scratch was integrated with an optical microscope to test regions void of pre-existing cracks.

Micro-Indentation Testing

The grid indentation method was implemented to evaluate the mechanical behavior of geopolymer nanocomposites. For each series of tests, an 11 by 11 array of indentation tests was conducted using a Berkovich indenter. The indenter contact area function was calibrated using fused silica before testing. Each indentation test was characterized by a maximum vertical force of 500 mN, a loading/unloading rate of 1000 mN/min, and a 10-second pause. The interindent spacing was 100 µm. For each indent, the vertical force P and penetration depth h were recorded using high-resolution force and displacement sensors with a precision of respectively 20 nN and 0.01 nm. For each indent, the indentation hardness H and indentation modulus M were calculated using the Oliver and Pharr's method as shown in Eqs. (1) and (4). (Oliver, 1992; Sorelli L et al., Cem Concr Res 38:1447-1456. https://doi.org/10.1016/j.cemconres.2008.09.002.)

$$S = \frac{dP}{dh}\bigg|_{h=h_{max}} \quad (4)$$

S is the unloading slope as defined in Eq. (3). The contact area Ac is calculated from the maximum depth hmax using the calibrated contact area function for the indenter.

Theoretical Approach
Fracture Toughness Determination Using Scratch Testing

Figure 8A:
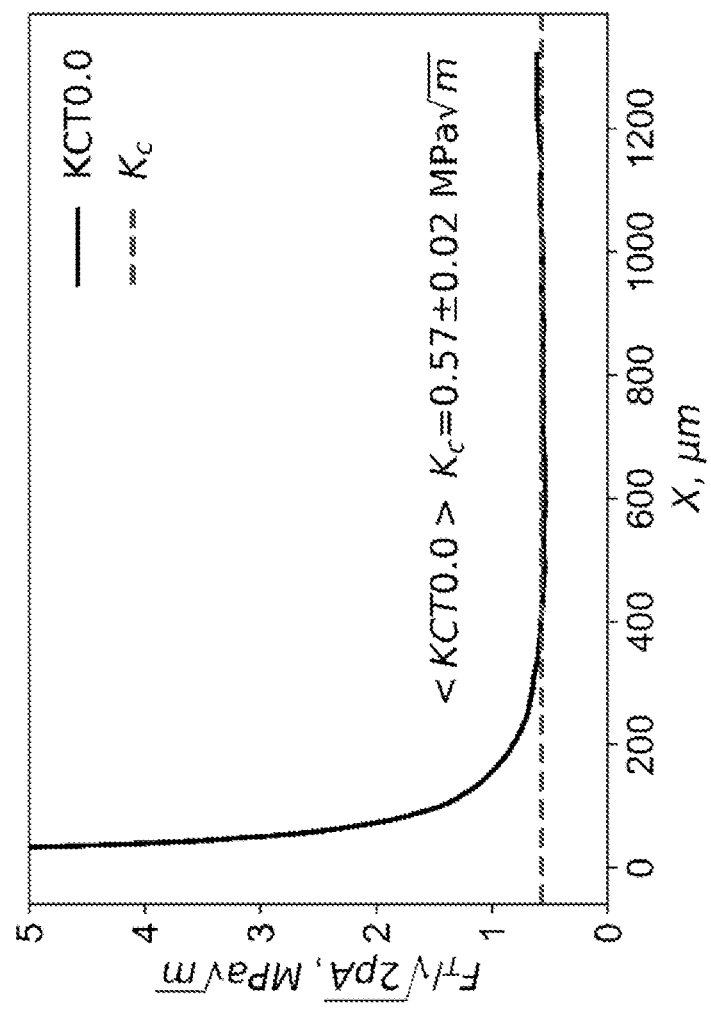
FIGS. 8A-8B show fracture analysis of scratch tests: FT is the horizontal force and FV is the vertical force.
Figure 8B:
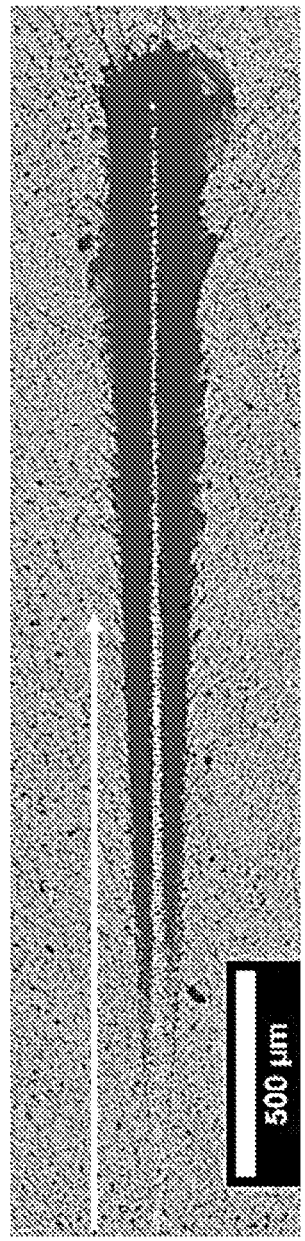

The nonlinear elastic fracture model described in Akono et al., 2012 and Akono et al., 2014 was used to analyze the scratch test results. The geopolymer nanocomposites at the microscopic length-scale were assumed to be linear elastic isotropic with a crack developing from the tip of the probe. Therefore, nonlinear fracture mechanics and the J-integral were implemented to calculate the critical energy release rate along with the fracture toughness Kc. The fracture toughness Kc was related to the horizontal force FT and the probe shape function 2pA as shown in Eq. 5.

$$K_c = \frac{F_T}{\sqrt{2pA}} \mathcal{F}\left(\frac{d}{R}\right) \quad (5)$$

d is the penetration depth and R=200 µm is the probe tip radius. The inventors focused on the spherical region of the scratch probe characterized by d<27 µm and calibrated the scratch probe prior to scratch testing using a reference material. F is a function equal to unity at infinity. FIG. 8A displays the quantity $F_T/\sqrt{2pA}$ as a function of the scratch length X. An optical microscopic image of the residual groove after scratch testing is also shown in FIG. 8B: a groove of increasing width was observed, pointing to material removal processes at work during scratch testing. For scratch lengths less than 400 µm, $F_T/\sqrt{2pA}$ decreased sharply, pointing to a ductile failure process. For scratch lengths greater than 400 µm, the quantity $F_T/\sqrt{2pA}$ converged toward a horizontal asymptote that is the size-independent fracture toughness value. Additional details regarding fracture toughness measurements are provided in the Supplementary Information below.

Cluster Analysis of Micro-Indentation Data
Micro-Mechanics Model

The aim was to employ micromechanical modeling to connect the elastic modulus to the micro-porosity. (Kendall A K, et al. (1983) The Relation between Porosity, Microstructure and Strength, and the Approach to Advanced Cement-Based Materials and Discussion, Source: Philosophical Transactions of the Royal Society of London. Series A, Mathematical and Physical Sciences.) A classic model proposed by Rice postulates an exponential relationship between the elastic modulus and the microporosity: $M_i=M_0 \exp(-t\varphi i)$. (Rice R W (1999) J Mater Sci 34:2769-2772. For a given indentation test i, $M_i$ is the indentation modulus and $\varphi_i$ is the local porosity of the probed volume. t is a fitting constant and $M_0$ is the ideal solid skeleton indentation modulus with zero micro-porosity. (Akono A T et al. (2019) Cem Concr Compos 104:103361. https://doi.org/10.1016/j.cemconcomp.2019.103361.) A nonlinear regression and minimization algorithm were utilized in Python to obtain the optimal relationships for the microindentation tests on geopolymer nanocomposites. The nonlinear regression and minimization algorithm relied on the Truncated Newton's method (or Hessian-free optimization). (Nash S G (2000) J Comput Appl Math 124:45-59. The initial value of the microporosity was obtained from the average porosity calculated from digital image analysis.

Bayesian Gaussian Mixture Model

The cluster analysis method was applied to the distribution of the indentation data and local porosity: $(M_i, H_i, \varphi_i)$, $1 \leq i \leq 121$. (Michie D (1968) Nature 218:19-22. Akono A et al. (2016) New Front Oil Gas Explor 40124 and Constantinopoulos C, et al. (2006) IEEE Transactions on Pattern Analysis and Machine Intelligence, vol. 28, no. 6, pp. 1013-1018, June, doi:10.1109/TPAMI.2006.111.) The mechanical phases were identified via the Bayesian Gaussian Mixture programmed in Python. (Rasmussen C E (2000) Adv Neural Inf Process Syst 554-559; and Chellappa R, et al. (2009) Gaussian Encycl Biometrics 659-663. https://doi.org/10.1007/978-0-387-73003-5 196.) A Gaussian mixture Expectation-Maximization algorithm $P(X|\theta) = \Sigma_{i=0}^{K} \pi_i N(X|\mu_i, \Sigma_i)$ was used. (Vila J P, et al. (2013) IEEE Transactions on Signal Processing, vol. 61, no. 19, pp. 4658-4672, Oct. 1, doi: 10.1109/TSP.2013.2272287.) $P(X|\theta)$ is a Gaussian distribution with mean $\mu_i$ and covariance matrix $\Sigma_i$. $\pi_i$ is the weight of each phase. K=5 is the number of phases assumed initially. In addition, with the Bayesian Gaussian Mixture method, there is a prior distribution for parameters $\theta=(\pi, \mu, \Sigma)$. Here X=(M, H, $\varphi$) with M being the indentation modulus, H being the indentation hardness, and $\varphi$ being the local porosity. P refers to the probability distribution function. The Bayesian Gaussian mixture model postulates a prior distribution of the vector of estimates following Eq. 6:

$$p(\theta|X) = \frac{P(\theta)P(X|\theta)}{\int P(\theta)P(X|\theta)d\theta} \quad (6)$$

A diagonal covariance type was used. A Dirichlet distribution vector was used for weight concentration type.

Results
Rheology Test Results

Figure 9A:
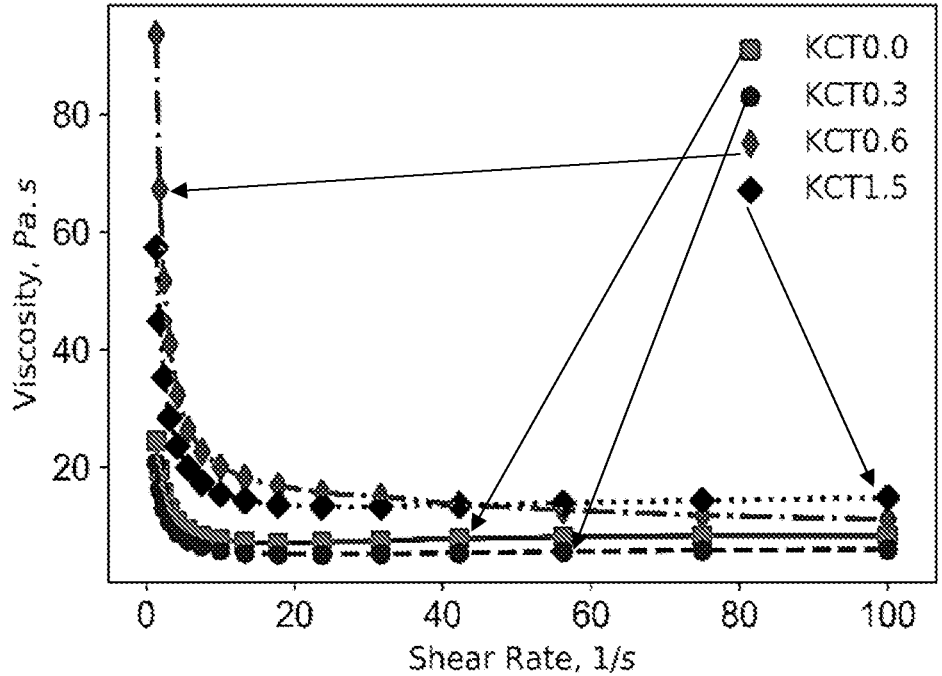
FIG. 9A shows viscosity η—shear stress $\tau_0$ relationships.
Figure 9B:
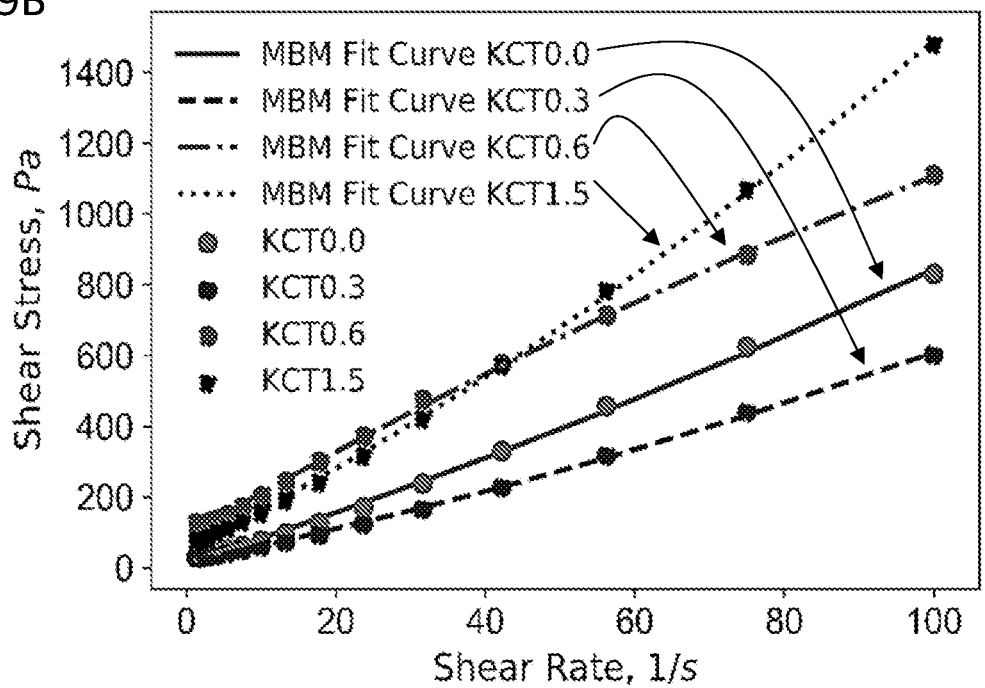
FIG. 9B shows the relationship between shear rate and shear stress of KCT0.0; KCT0.3; KCT0.6; KCT1.5.
Figure 10:
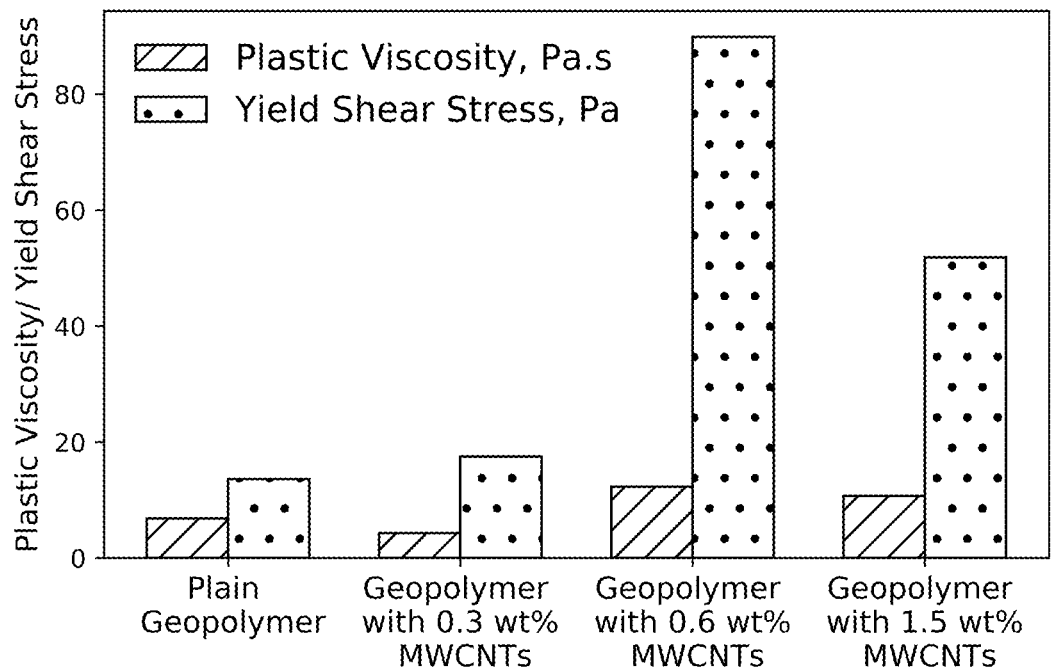
FIG. 10 shows a bar plot of plastic viscosity ηp and yield shear stress $\tau_0$.

Rheology tests were employed to investigate the behavior of geopolymer nanocomposites under fresh state. The evolution of the viscosity is shown for different shear rates in FIG. 9A. In addition, the shear stress-shear rates curves are presented in FIG. 9B along with the Modified Bingham Model fitting curves. Shear-thickening non-Newtonian behavior was observed. The results showed that the addition of 0.3 wt % MWCNTs decreased the plastic viscosity compared to the plain geopolymer. However, for KCT0.6 and KCT1.5, a higher plastic viscosity and shear stress were observed compared to plain geopolymer. When the shear rate was less than 40 1/s, KCT0.6 had the highest plastic viscosity. Moreover, when the shear rate increased, KCT1.5 had the highest plastic viscosity. The plastic viscosity and yield shear stress values obtained from the Modified Bingham Model are shown in Table 5. There was an increasing trend of yield shear stress with the addition of MWCNTs as shown in FIG. 10. Except for KCT0.3, KCT0.6, and KCT1.5, an increase in plastic viscosity by 79.79% and 56.37%, respectively, were noted. Similarly, the yield shear stress increased by 28.29%, 560.32%, and 280.96% for KCT0.3, KCT0.6, and KCT1.5.

TABLE 5

Rheology results of KCT0.0; KCT0.3; KCT0.6; KCT1.5. $\eta_p$ represents plastic viscosity, while $\tau_0$ represents yield shear stress. $R^2$ represents coefficient of determination.

| Specimen | $\eta_p$ (Pa · s) | $\tau_0$, Pa | c | $R^2$ |
|---|---|---|---|---|
| KCT0.0 | 6.83 | 13.61 | 0.015 | 0.999956 |
| KCT0.3 | 4.32 | 17.46 | 0.016 | 0.999957 |
| KCT0.6 | 12.28 | 89.87 | −0.021 | 0.999975 |
| KCT1.5 | 10.68 | 51.85 | 0.037 | 0.999987 |

X-Ray Powder Diffraction and Fourier-Transform Infrared Spectroscopy

Figure 11:
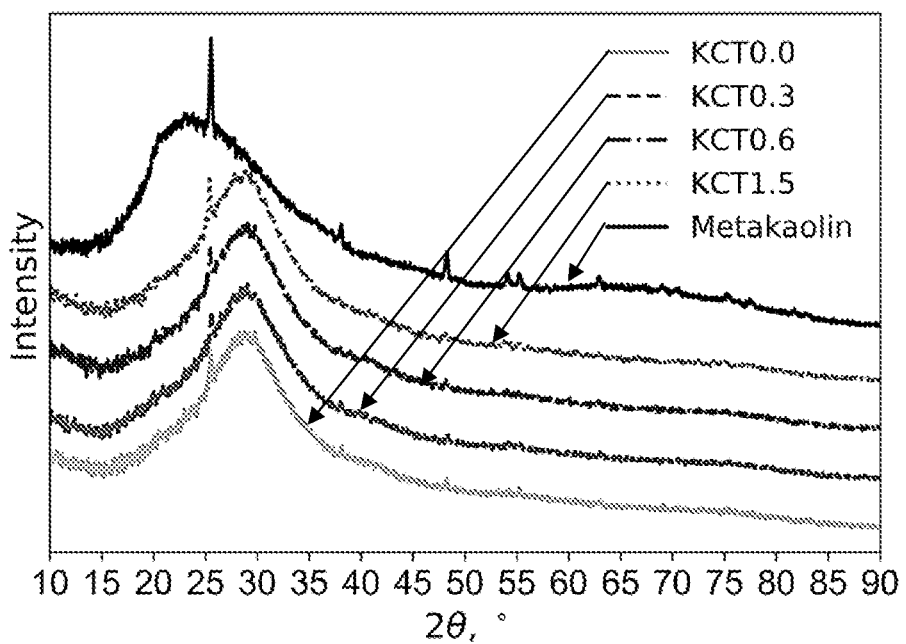
FIG. 11 shows X-Ray powder diffraction (XRPD) results of KCT0.0, KCT0.3, KCT0.6, KCT1.5, metakaolin. (Background subtraction) (Stacked).
Figure 12A:
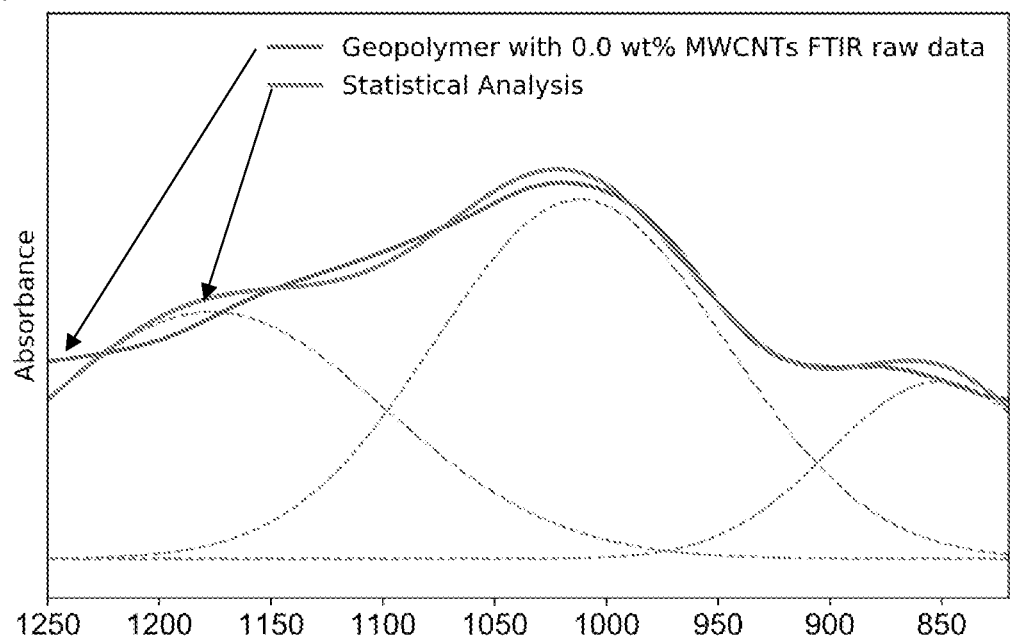
FIGS. 12A-12D show statistical analysis of Fourier-Transform Infrared Spectroscopy (FTIR) results of KCT0.0, KCT0.3, KCT0.6, KCT1.5 from 820-1250 $cm^{-1}$.
Figure 12B:
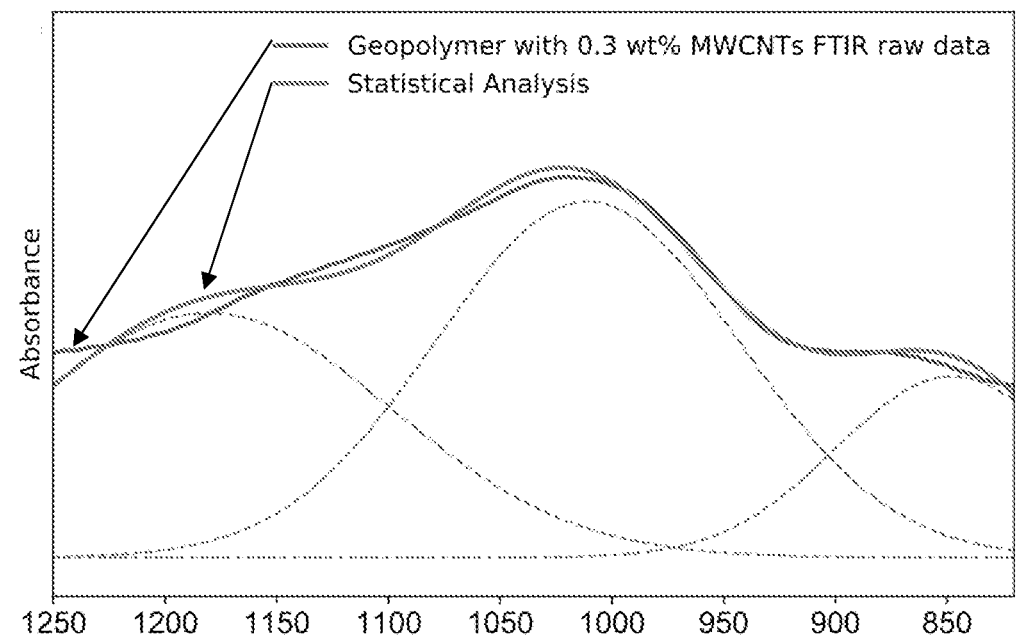
Figure 12C:
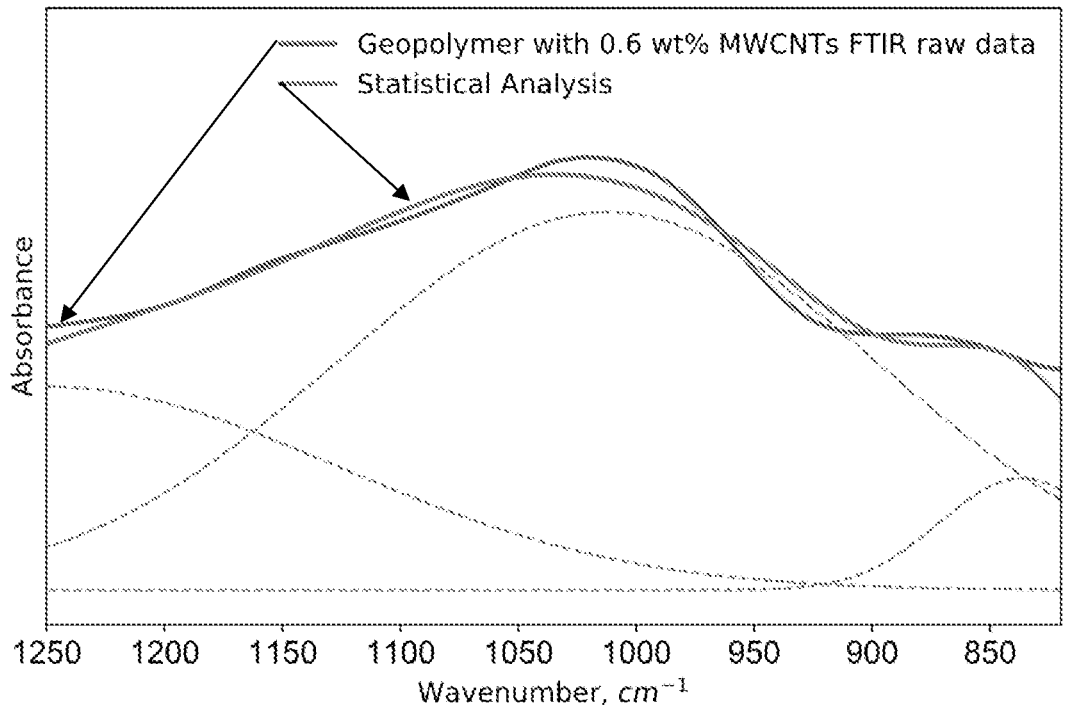
Figure 12D:
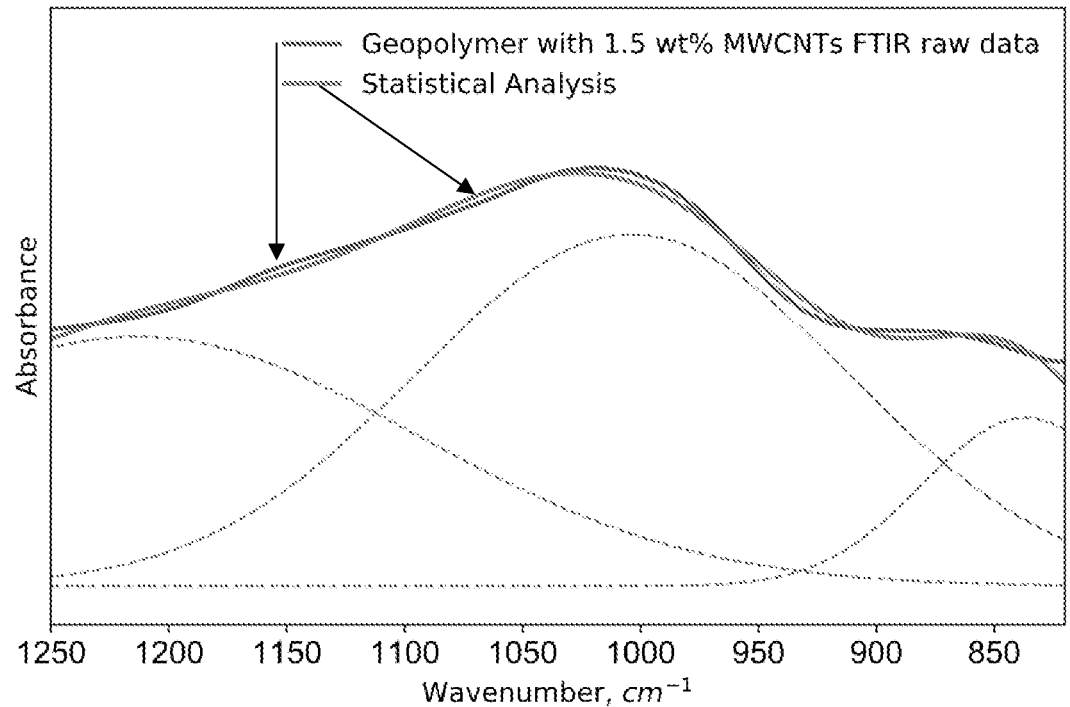

To understand the chemical influence of MWCNTs on the chemistry of geopolymer nanocomposites in the hardened state, XRPD and FTIR were applied. FIG. 11 displays the X-ray diffractograms for the geopolymer nanocomposites. For KCT0.0, the XRD is amorphous with a broad peak located around 2θ=28°. The sharp peak located around 2θ=25° refers to the titanium dioxide present in the raw metakaolin material. The results show that MWCNTs preserve the amorphous structure of geopolymer nanocomposites.

The FTIR spectra are shown in FIGS. 12A-12D. The wavenumber range 800-1250 cm$^{-1}$ was the focus. A statistical deconvolution of the FTIR spectrum was performed: the computed peaks are given in Table 6. Three main peaks were observed. The first peak around 840 cm$^{-1}$ represents the Si—OH bending vibration. The second peak around 1008 cm−1 represents the asymmetrical vibration of Si(Al)—O. Finally, the third peak around 1080-1100 cm$^{-1}$ represents the symmetrical vibration of Si—O. A decrease in the wave number characteristic of the bending vibration of Si—OH was observed: this decrease points to an increase in mass of Si—OH bonds. Thus, MWCNTs promote the formation of Si—OH bonds. In return, there was a decrease in the wave number characteristic of symmetrical vibration in Si—O bonds, pointing to a reduction of Si—O bonds. Thus, MWCNTs prohibit Si—O bonding. Finally, the wave number for the asymmetrical vibration for Si(Al)—O remained the same for KCT0.3 and KCT0.6 and decreased for KCT1.5. Prior studies have related the frequency of the Si(Al)—O asymmetrical vibration band to the Si/Al ratio. (Davidovits, J. (2015) Geopolymer Chemistry and Applications. 5th edition. Saint-Quentin, France.) Thus, the findings indicate that the Si/Al ratio remains unchanged for low fraction of MWCNTs.

scratch probe shape function. At the beginning of the scratch, penetration depths were relatively low, which resulted in the extreme variation of the FT/$\sqrt{2pA}$. At this stage, the fracture mechanism combines plasticity and elasticity. With the development of scratch, FT/$\sqrt{2pA}$ reached a convergence regime. The convergence of FT/$\sqrt{2pA}$ indicates that the fracture mechanism developed from ductile to brittle, where linear elastic fracture mechanics domains. The fracture toughness value of plain geopolymer is 0.57±0.03 MPa$\sqrt{m}$, which agrees with the fracture toughness of plain metakaolin geopolymer measured at the macroscopic scale using three-point bending tests. (Zhang P et al. (2020) 46:20027-20037.) Therefore, the model to assess the fracture toughness at the microscopic scale is valid. High fractions of MWCNTs improved the fracture toughness of metakaolin-based potassium geopolymer. The fracture toughness values were 0.53±0.02, 0.58±0.01, 0.63±0.03 MPa$\sqrt{m}$, respectively, for KCT0.3, KCT0.6, and KCT1.5. A drop in fracture toughness was observed with the addition of 0.3 wt. % MWCNTs. There was a slight increase of 1.75% with the addition of 0.6 wt. % MWCNTs. There was a huge increase of 10.52% with the addition of 1.5 wt. % MWCNTs compared to the plain geopolymer.

Optical Microscopy Imaging Results

The optical microscopy images shown in FIGS. 14A-14D show the presence in plain geopolymer of large microscopic pores, 100 μm in size. With the addition of MWCNTs, the size of pores decreased. To quantify the change in microporosity, digital image analysis was applied. The computed average microporosity values were 8.698%, 4.576%, 5.664%, and 7.072%, respectively, for KCT0.0, KCT0.3, KCT0.6, and KCT1.5. Overall, a decrease in microporosity was noted in MWCNT-reinforced geopolymers compared to the plain geopolymer. Yet, by comparing MWCNT-reinforced geopolymers, an increase in microporosity was noted as the fraction of MWCNT reinforcement increased. Recall-

TABLE 6

Statistical analysis results of FTIR, where Vol. represents volume fraction, and $s^i$ presents standard deviation of each peak.

| Name | Peak 1 cm$^{-1}$ | Vol. | $s^1$ cm$^{-1}$ | Peak 2 cm$^{-1}$ | Vol. | $s^2$ cm$^{-1}$ | Peak 3 cm$^{-1}$ | Vol. | $s^3$ cm$^{-1}$ |
|---|---|---|---|---|---|---|---|---|---|
| KCT0.0 | 851.0 | 22.6% | 49.2 | 1011.7 | 45.8% | 64.9 | 1176.7 | 31.5% | 77.9 |
| KCT0.3 | 847.7 | 23.2% | 51.7 | 1011.0 | 45.5% | 68.0 | 1180.5 | 31.3% | 82.1 |
| KCT0.6 | 836.6 | 16.1% | 34.7 | 1012.4 | 54.5% | 113.8 | 1250.0 | 29.3% | 123.8 |
| KCT1.5 | 836.8 | 21.9% | 43.5 | 1003.6 | 45.7% | 91.2 | 1213.4 | 32.4% | 118.6 |

Fracture Toughness of Geopolymer Nanocomposites

Figure 13:
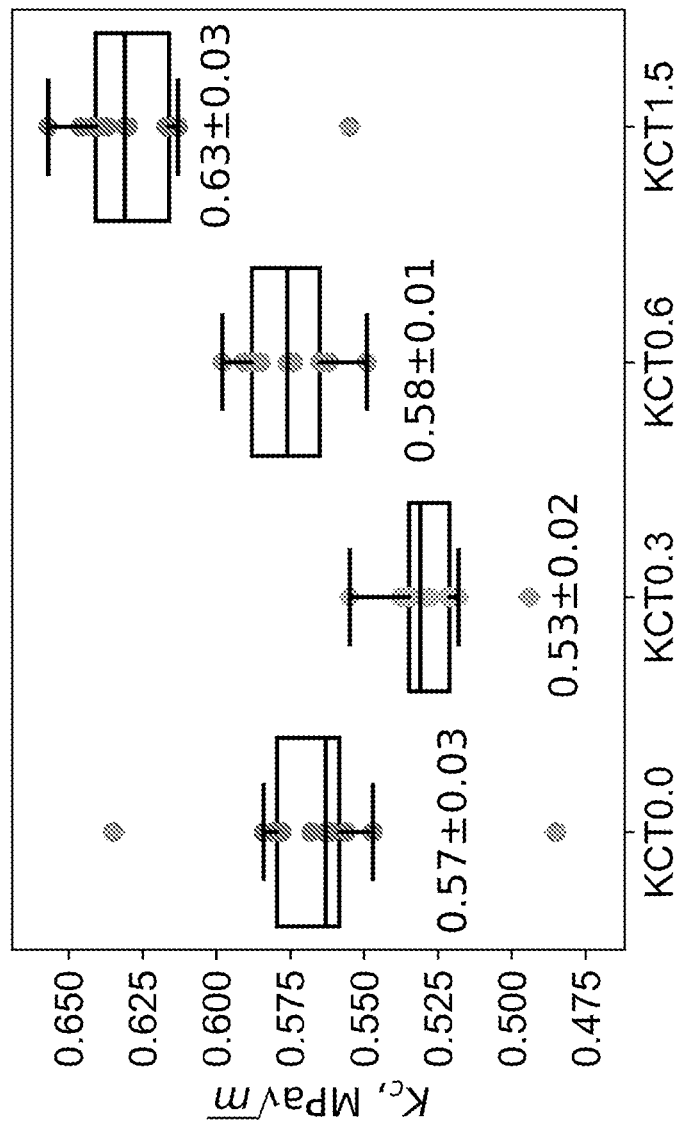
FIG. 13 shows scratch results of KCT0.0; KCT0.3; KCT0.6; and KCT1.5.
Figure 14A:
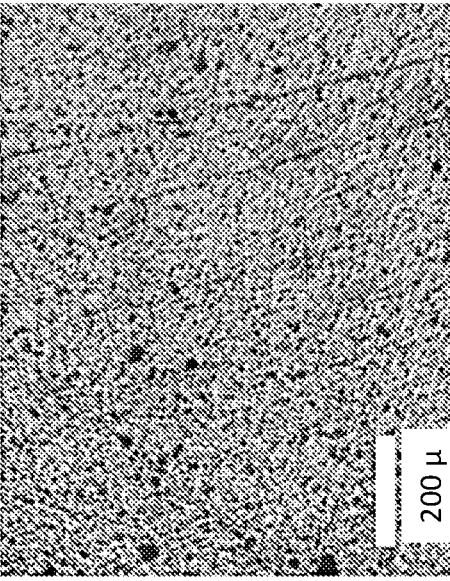
FIGS. 14A-14D show microscopic images of (FIG. 14A) KCT0.0.
Figure 14C:
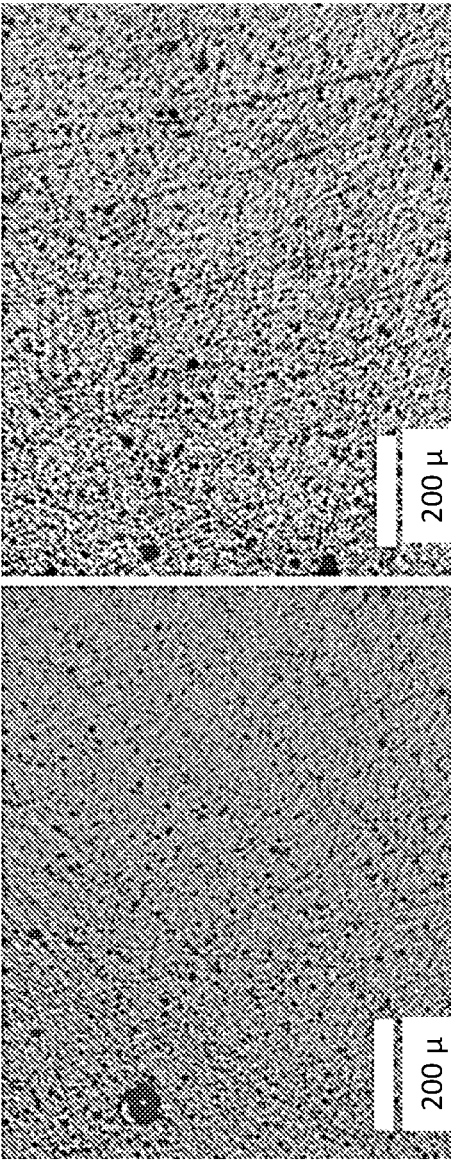
Figure 14B:
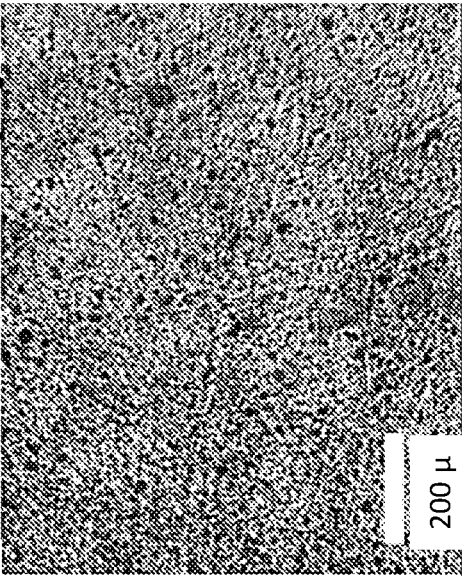
Figure 14D:
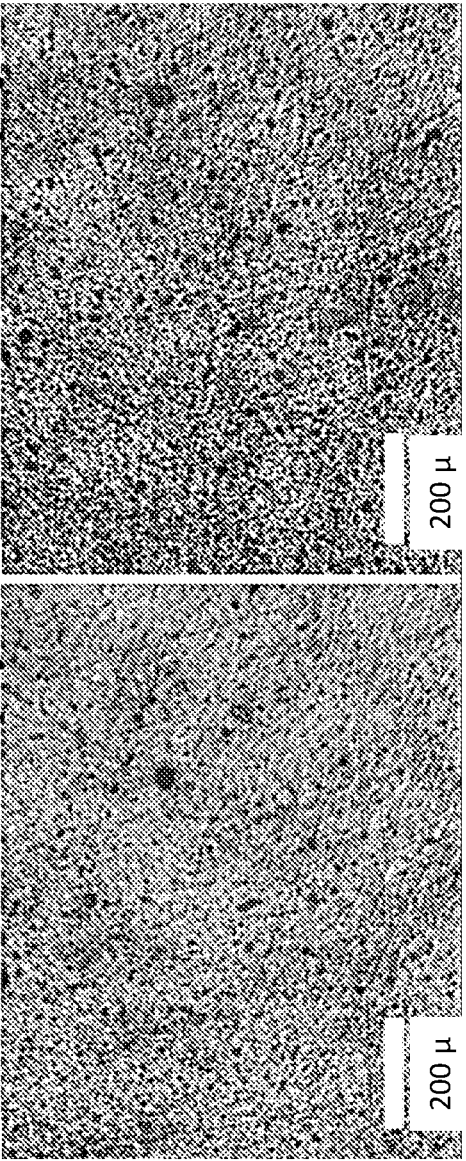
Figure 15B:
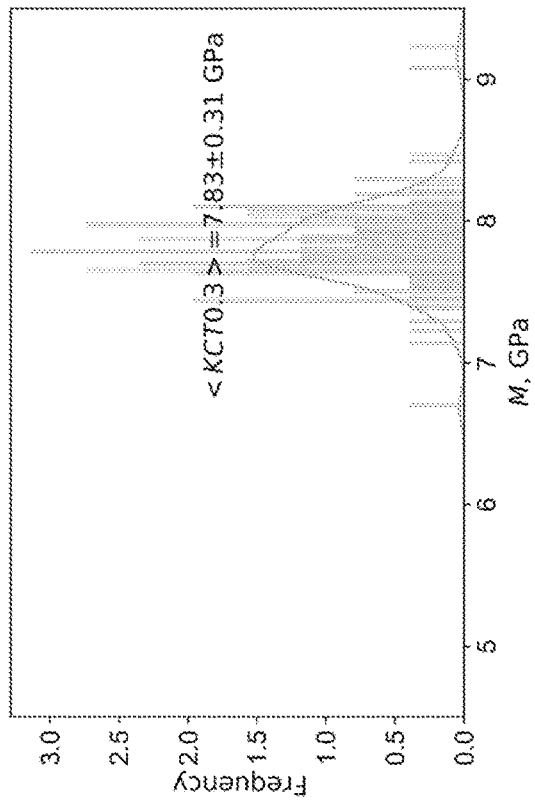
FIGS. 15A-15D show an indentation modulus M histogram.
Figure 15D:
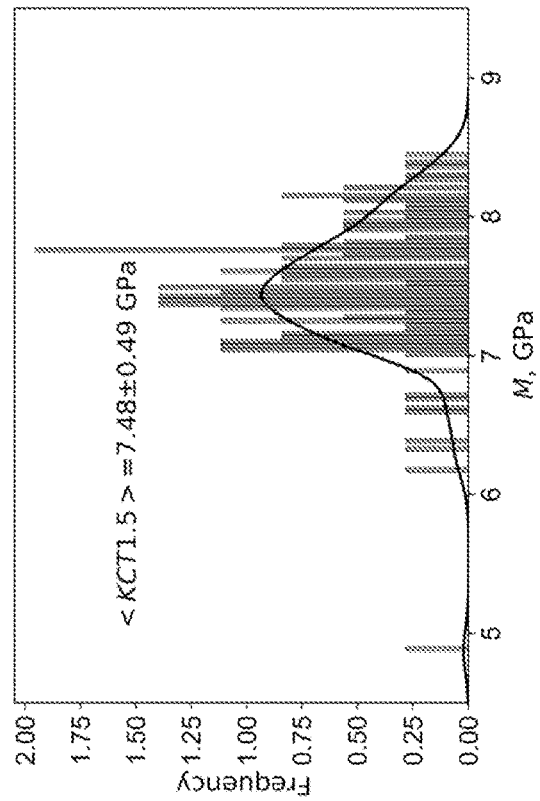
Figure 15A:
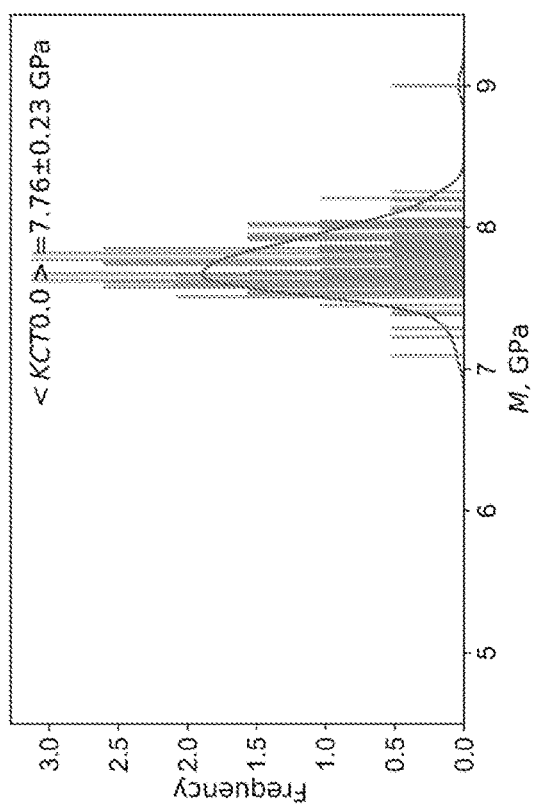
Figure 15C:
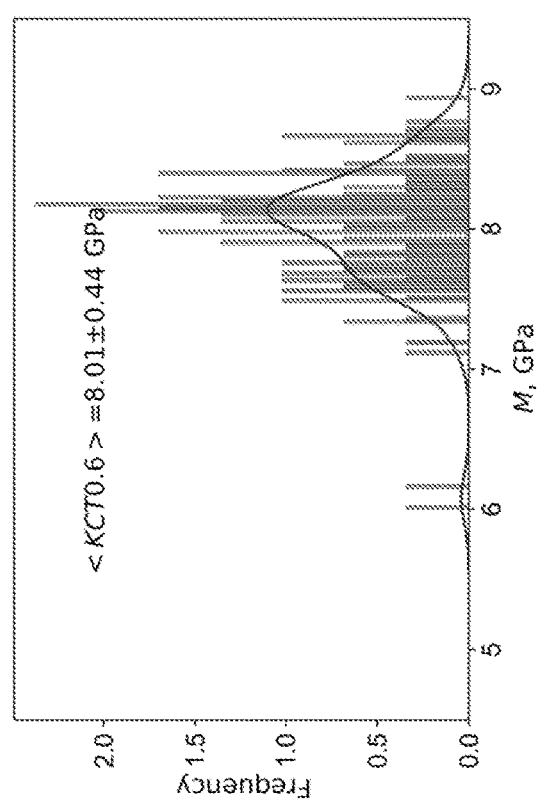
Figure 16A:
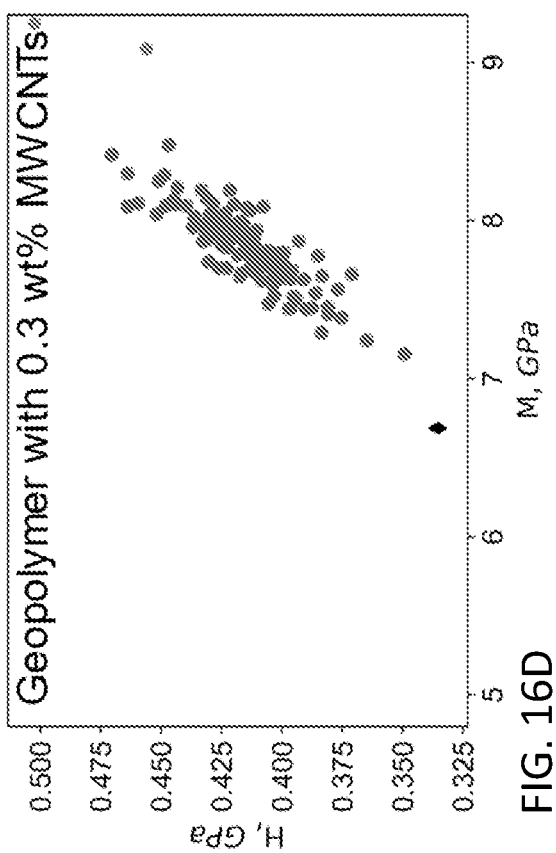
FIGS. 16A-16D show a cluster analysis of the indentation hardness H (GPa) and indentation modulus M (GPa)
Figure 16B:
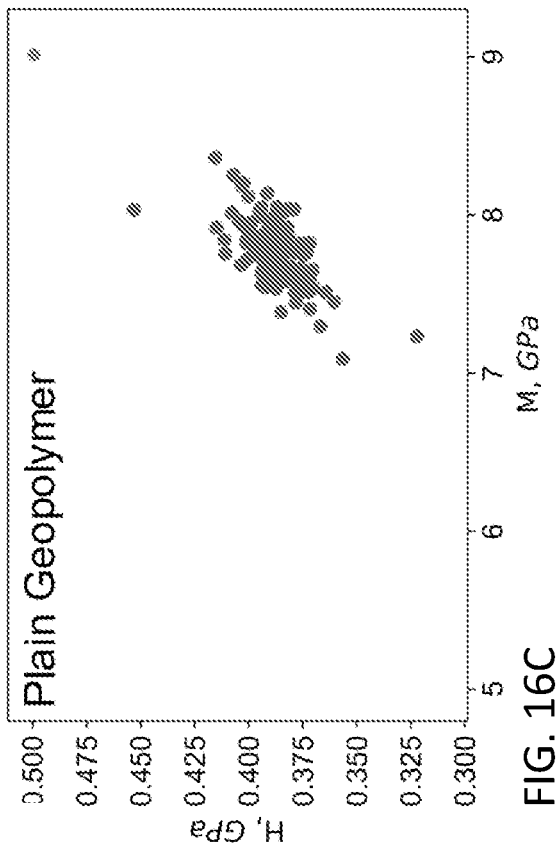
Figure 16C:
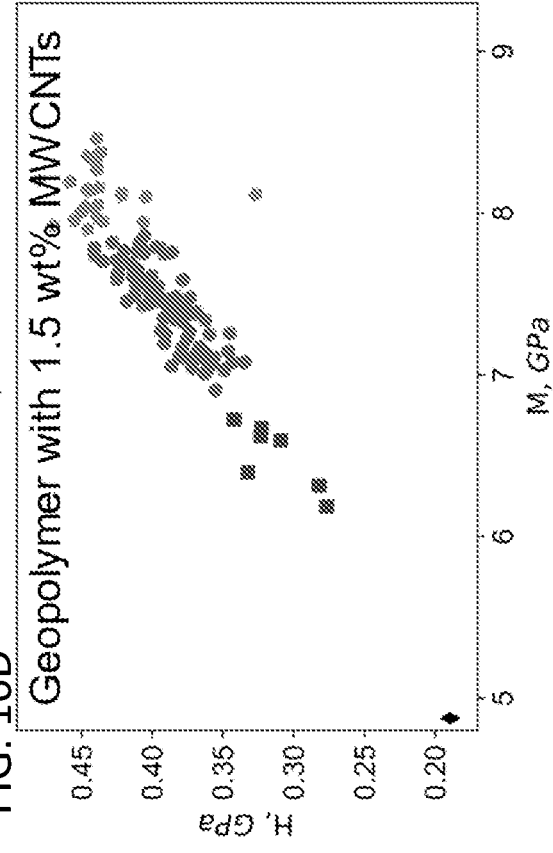
Figure 16D:
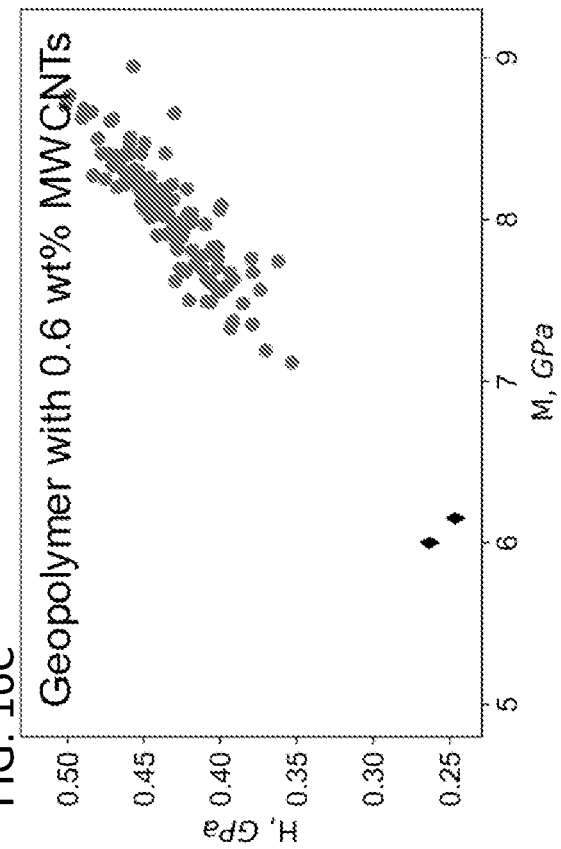
Figure 17A:
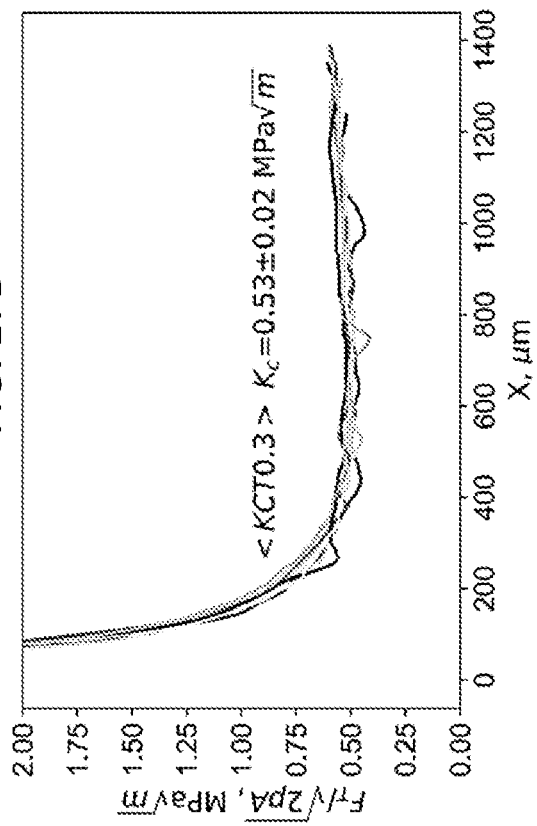
FIGS. 17A-17D show fracture toughness plots of all scratch results.
Figure 17B:
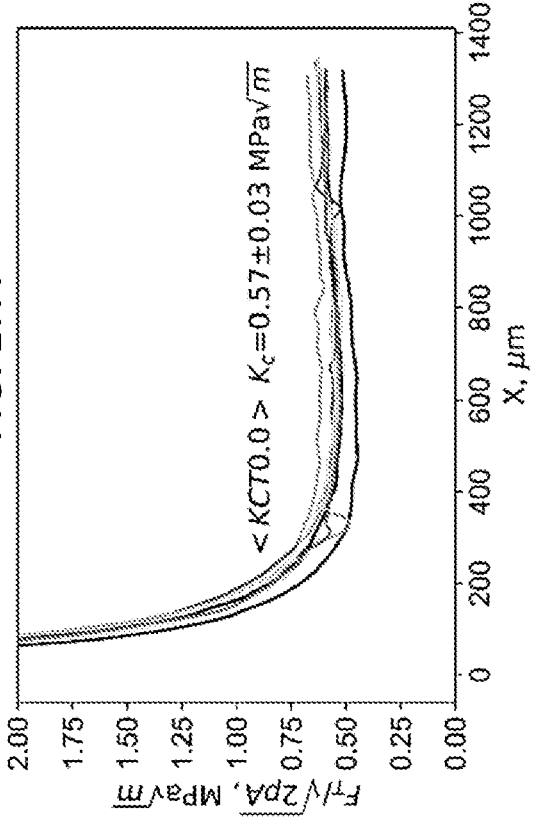
Figure 17C:
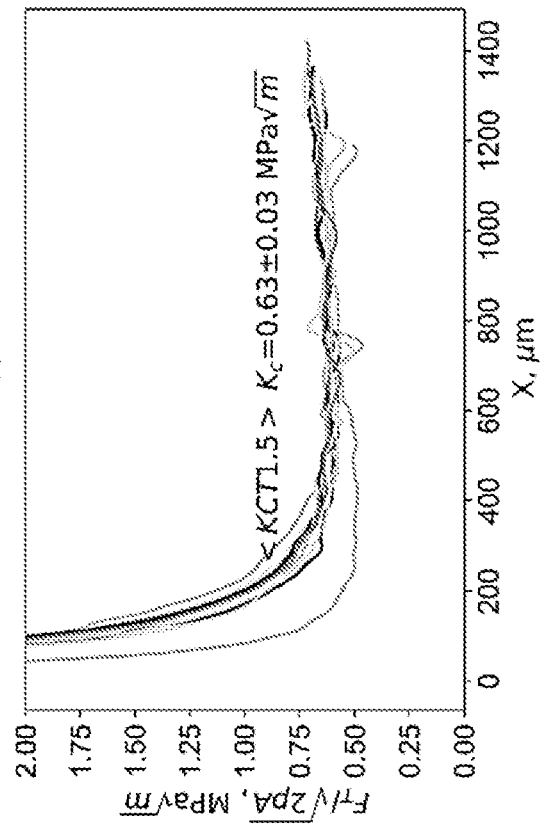
Figure 17D:
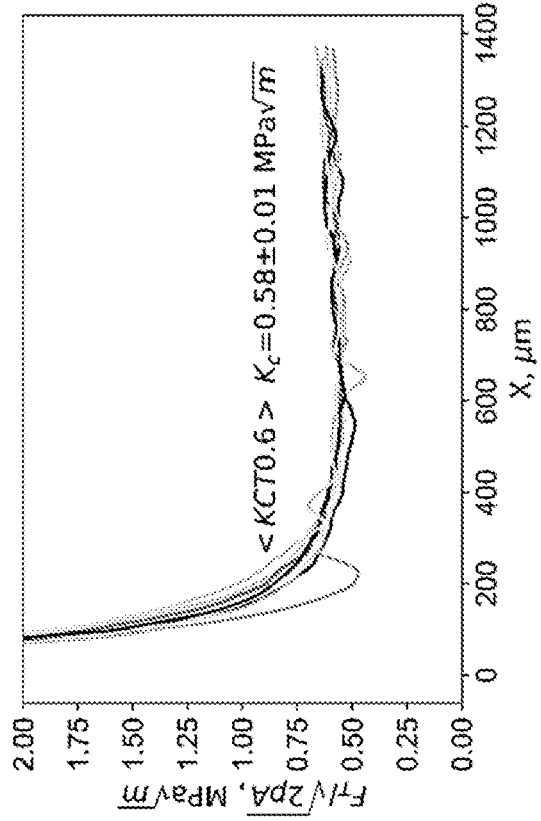

Scratch testing was used to understand the influence of MWCNTs reinforcement on the fracture performance. The results of scratch testing were shown in FIG. 13. The quantity FT/$\sqrt{2pA}$ was plotted along scratch length X. FT was defined as the horizontal force while 2pA was the ing the rheology test results, see FIGS. 9A-9B and FIG. 10, the plastic viscosity increased as the fraction of MWCNT increased, which may explain the observed increase in microporosity for MWCNT-reinforced geopolymers. Thus, two competitive trends were observed: (i) on the one hand, MWCNTs lead to a reduction in pore size and pore fraction;

(ii) on the other hand, the increase in plastic viscosity of the MWCNT-reinforced geopolymer slurries promotes the development of microscopic air voids. Additional details regarding optical microscopy image analysis are provided in the Supplementary Information below Grid Indentation and Statistical Deconvolution Results Grid indentation was implemented to characterize the underlying mechanical phases at the microscopic lengthscale, based on the distribution of the indentation modulus M, indentation hardness H, and local microporosity φ. FIGS. 15A-15D display the histograms of the indentation modulus. The presence of MWCNTs affects the frequency of the indentation modulus. A broadening of the peak of the indentation modulus was also observed. This broadening of the peak points to an increase in the heterogeneity leveled as the fraction of MWCNTs increased. The measured average indentation modulus was 7.76±0.23, 7.83±0.31, 8.01±0.44, and 7.48±0.49 GPa, respectively, for plain geopolymer, KCT0.3, KCT0.6, and KCT1.5. Thus, the average indentation modulus increased by 0.9% and 3.2% with the addition of 0.3 wt. % and 0.6 wt. % MWCNTs. However, incorporating 1.5 wt. % MWCNTs decreased the indentation modulus by 3.6%. Similarly, the measured average value of the indentation hardness is 388.27±16.93, 414.41±23.60, 431.33±37.67, and 392.31±41.20 MPa, respectively, for plain geopolymer, KCT0.3, KCT0.6, and KCT1.5. Thus, the addition of MWCNTs increased the indentation hardness by 6.7%, 11.1%, and 1.04%, respectively, for 0.3 wt. %, 0.6 wt. %, and 1.5 wt. % MWCNTs.

To quantify the phase transformation or the shift, cluster analysis was implemented. FIGS. 16A-16D display the results of the cluster analysis. The detailed characteristics for all phases in all specimens are given in Table 7. The main phase had a 7.834 GPa indentation modulus, a 0.388 GPa indentation hardness, and an 8.7% porosity. For KCT0.3, the main phase characteristics increased to 7.821 GPa for the indentation modulus and 0.414 GPa for the indentation hardness; meanwhile, the porosity decreased to 5.6%. For KCT0.6, the reinforcement effects prevailed, where the main phase was strengthened with an 8.012 GPa modulus, a 0.431 GPa hardness, and a 3.3% porosity. However, for KCT1.5, a bimodal distribution was observed with two dominating phases. One is a weaker phase with a 7.418 GPa modulus, a 0.389 GPa indentation hardness, and a 7.5% porosity. The other one is a stronger phase with an 8.0803 GPa modulus, a 0.434 GPa hardness, and a 0.4% porosity. Here, the FTIR results were recalled. see FIGS. 12A-12D and statistical results in Table 6, where KCT0.6 showed an increase in structural changes, which refers to the geopolymerization. The indentation results agree with the FTIR result and show that KCT0.6 exhibits the highest values of the indentation modulus and hardness. Overall, the indentation results show that the addition of MWCNTs promotes the growth of a stronger geopolymer phase.

TABLE 7

Cluster analysis volume fraction results of KCT0.0, KCT0.3, KCT0.6, KCT1.5, where $\mu^M$, $\mu^H$, $\mu^\varphi$ represents the average indentation modulus, hardness, and porosity while $s^M$, $s^H$, $s^\varphi$ represents the standard derivation of indentation modulus, hardness, and porosity.

| Sample Name | Phase | Volume Fraction | $\mu^M$ GPa | $s^M$ GPa | $\mu^H$ GPa | $s^M$ GPa | $\mu^\varphi$ | $s^\varphi$ |
|---|---|---|---|---|---|---|---|---|
| KCT0.0 | Porous Phase | 0.991 | 7.752 | 0.047 | 0.388 | 0.001 | 0.088 | 0.000 |
|  | Geopolymer | 0.004 | 7.763 | 0.167 | 0.388 | 0.033 | 0.087 | 0.007 |
|  | Geopolymer | 0.000 | 7.763 | 0.167 | 0.388 | 0.033 | 0.087 | 0.007 |
|  | Geopolymer | 0.000 | 7.763 | 0.167 | 0.388 | 0.033 | 0.087 | 0.007 |
|  | Stronger | 0.004 | 8.999 | 0.129 | 0.498 | 0.025 | 0.038 | 0.005 |
| KCT0.3 | Porous Phase | 0.005 | 6.700 | 0.128 | 0.336 | 0.025 | 0.107 | 0.005 |
|  | Geopolymer | 0.967 | 7.821 | 0.061 | 0.414 | 0.001 | 0.056 | 0.000 |
|  | Geopolymer | 0.008 | 7.834 | 0.167 | 0.415 | 0.033 | 0.055 | 0.007 |
|  | Geopolymer | 0.006 | 7.834 | 0.167 | 0.479 | 0.033 | 0.055 | 0.007 |
|  | Stronger | 0.014 | 9.156 | 0.106 | 0.498 | 0.020 | 0.003 | 0.004 |
| KCT0.6 | Porous Phase | 0.016 | 6.087 | 0.110 | 0.256 | 0.020 | 0.149 | 0.004 |
|  | Geopolymer | 0.008 | 8.012 | 0.167 | 0.431 | 0.033 | 0.058 | 0.007 |
|  | Geopolymer | 0.000 | 8.012 | 0.167 | 0.431 | 0.033 | 0.058 | 0.007 |
|  | Geopolymer | 0.000 | 8.012 | 0.167 | 0.431 | 0.033 | 0.058 | 0.007 |
|  | Stronger | 0.975 | 8.044 | 0.128 | 0.434 | 0.002 | 0.056 | 0.000 |
| KCT1.5 | Porous Phase | 0.016 | 4.901 | 0.142 | 0.191 | 0.025 | 0.213 | 0.005 |
|  | Geopolymer | 0.062 | 6.493 | 0.080 | 0.311 | 0.011 | 0.119 | 0.002 |
|  | Geopolymer | 0.699 | 7.418 | 0.068 | 0.389 | 0.002 | 0.075 | 0.000 |
|  | Geopolymer | 0.008 | 7.487 | 0.167 | 0.393 | 0.033 | 0.073 | 0.007 |
|  | Stronger | 0.215 | 8.083 | 0.049 | 0.434 | 0.004 | 0.046 | 0.001 |

Additional details regarding indentation hardness measurements are provided in the Supplementary Information below Discussion Potential Applications of MWCNT-Geopolymer for 3-D Printing In terms of rheology, two of the most important factors in 3-D printing geopolymers are the plastic viscosity and the yield shear stress. The plain geopolymer KCT0.0 had a yield stress of 13.61 Pa. For higher fractions of MWCNTs, >0.3 wt. %, it was found that MWCNTs had a significant effect on the rheological properties. For KCT0.6 and KCT1.5, the plastic viscosity increased by 79.8% and by 56.37%. Finally, the yield shear stress increased by 28.29%, 560.32%, and 280.96% for KCT0.3, KCT0.6, and KCT1.5.

The plastic viscosity for geopolymer nanocomposites is in the range of the viscosity of geopolymer mortars used for 3-D printing. The increase in both the yield shear stress and plastic viscosity makes MWCNT-reinforced geopolymer inks attractive for 3-D printing applications. In addition, the MWCNT fraction influenced the rheological properties. As a result, for future applications, the yield stress and plastic viscosity can be tailored by adjusting the fraction of reinforcing nanomaterials like MWCNTs so as to optimize simultaneously the rheological behavior in the fresh state and the mechanical properties in the hardened state.

Effect of MWCNTs on Microstructure and Mechanical Response

X-ray diffraction (XRD) shows that MWCNTs preserve the amorphous structure of metakaolin-based potassium geopolymer. FTTR results show that MWCNTs affect chemical bonds: specifically, an increase in Si—OH bonds and a reduction in Si—O bonds were observed. Thus, MWCNTs promote the hydroxylation of Si atoms in geopolymer. The inner strengthening is corroborated by the reduction in porosity, see FIGS. 14A-14D. Moreover, this inner strengthening effect was also observed in the statistical deconvolution results, see Table 7, as the mechanical properties of the dominant phase increased.

MWCNTs stiffen metakaolin-based geopolymer matrices. For low mass fractions of MWCNTs, less than 0.6 wt. %, the average indentation modulus increased as the mass fraction of MWCNTs increased. The sharp decline in indentation modulus for 1.5 wt. % can be explained by the increase in microporosity. Furthermore, the microscopic fracture tests indicate a positive correlation between the fracture toughness and the mass fraction of MWC-NTs.

Conclusions

Four types of metakaolin-based potassium geopolymer nanocomposites were studied, including plain geopolymers and geopolymers reinforced with 0.3 wt %, 0.6 wt %, and 1.5 wt % MWCNTs. Scratch testing was implemented to evaluate the fracture behavior at the micro-scale level. The mechanical behavior was investigated, including indentation hardness and indentation modulus, using statistical analysis. XRPD and FTIR were implemented to study the chemical influence by MWCNTs. Coupling the indentation results for mechanical testing, scratch results for fracture behavior, chemical characterization, and fresh state rheology characterization, the following conclusions were derived:

A mixing method is presented to yield high-performance metakaolin-based geopolymer nanocomposites reinforced with 0.6-1.5 wt % MWCNTs.

FTIR analysis showed that the structural changes were most pronounced for 0.6 wt. %, suggesting that MWCNTs accelerated the geopolymerization reaction. This result agrees with the XRD analysis.

The indentation modulus of plain geopolymer is 7.7 GPa: a 5% increase was observed with the addition of 0.6 wt. % MWCNTs. Statistical deconvolution analysis shows that MWCNTs strengthen the geopolymer matrix.

The fracture toughness of plain geopolymer is 0.57 MPa·$\sqrt{m}$: a 10% increase was observed with the addition of 0.6 wt. % MWCNTs and a 15% increase was observed with addition of 1.5 wt. % MWCNTs.

The micro-porosity initially decreased by 50% with the addition of 0.3 wt. % MWCNTs. Afterward, a steady increase in micro-porosity was observed as the fraction of MWCNTs increased.

An increase in the plastic viscosity and the shear yield stress was observed with the addition of MWCNTs, with the highest increase being for 0.6 wt. %. These results suggest that the plastic viscosity and the shear yield stress can be tailored with the addition of MWCNTs, with important implications for 3-D printing applications.

Supplementary Information

Fracture Toughness

Surface roughness less than 0.2 was selected for calculating the fracture toughness. Y-axis represents $F_T/\sqrt{2pA}$ while X-axis represents scratch length X as shown in FIGS. 17A-17D. $K_c$ was calculated by taking average of the $F_T/\sqrt{2pA}$ values in the linear fracture region, where X was larger than 600 μm. The mean value of fracture toughness $K_c$ on each type of sample was calculated by using 11 scratch tests. The average fracture toughness was 0.57, 0.53, 0.58, 0.63 MPa$\sqrt{m}$ for KCT0.0, KCT0.3, KCT0.6, and KCT1.5.

Indentation Hardness

Indentation hardness H histograms were shown in FIGS. 18A-18D. From plain geopolymer to geopolymer reinforced with MWCNTs, a shift from lower hardness value to higher hardness values was observed. In addition, there was an increase in terms of the average hardness value. From indentation, it was observed that the MWCNTs optimum amount was 0.6 wt. %, which agrees with the results for indentation modulus.

Image Analysis

Figure 19:
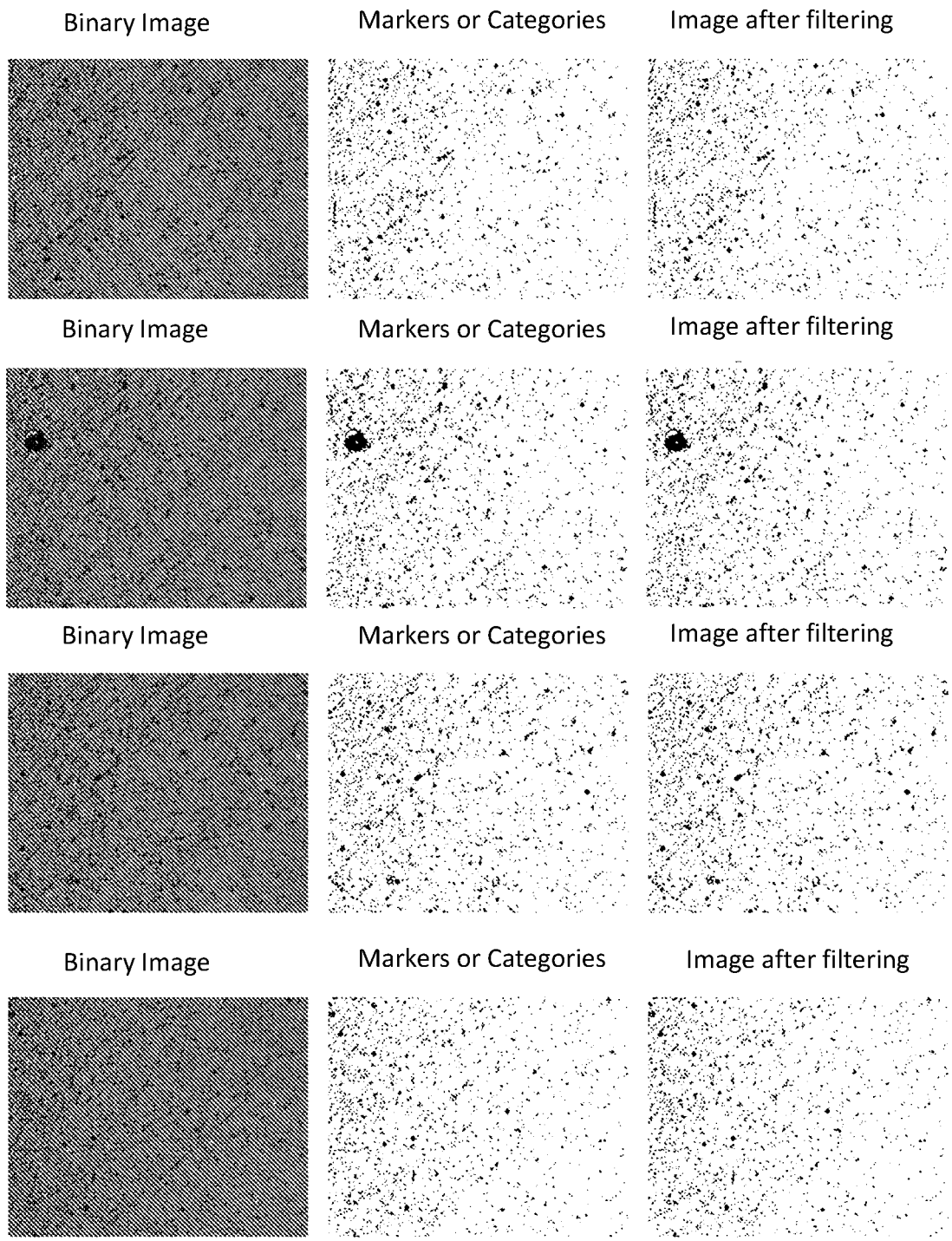
FIG. 19 shows an image analysis illustration for plain geopolymer KCT0.0.
Figure 20:
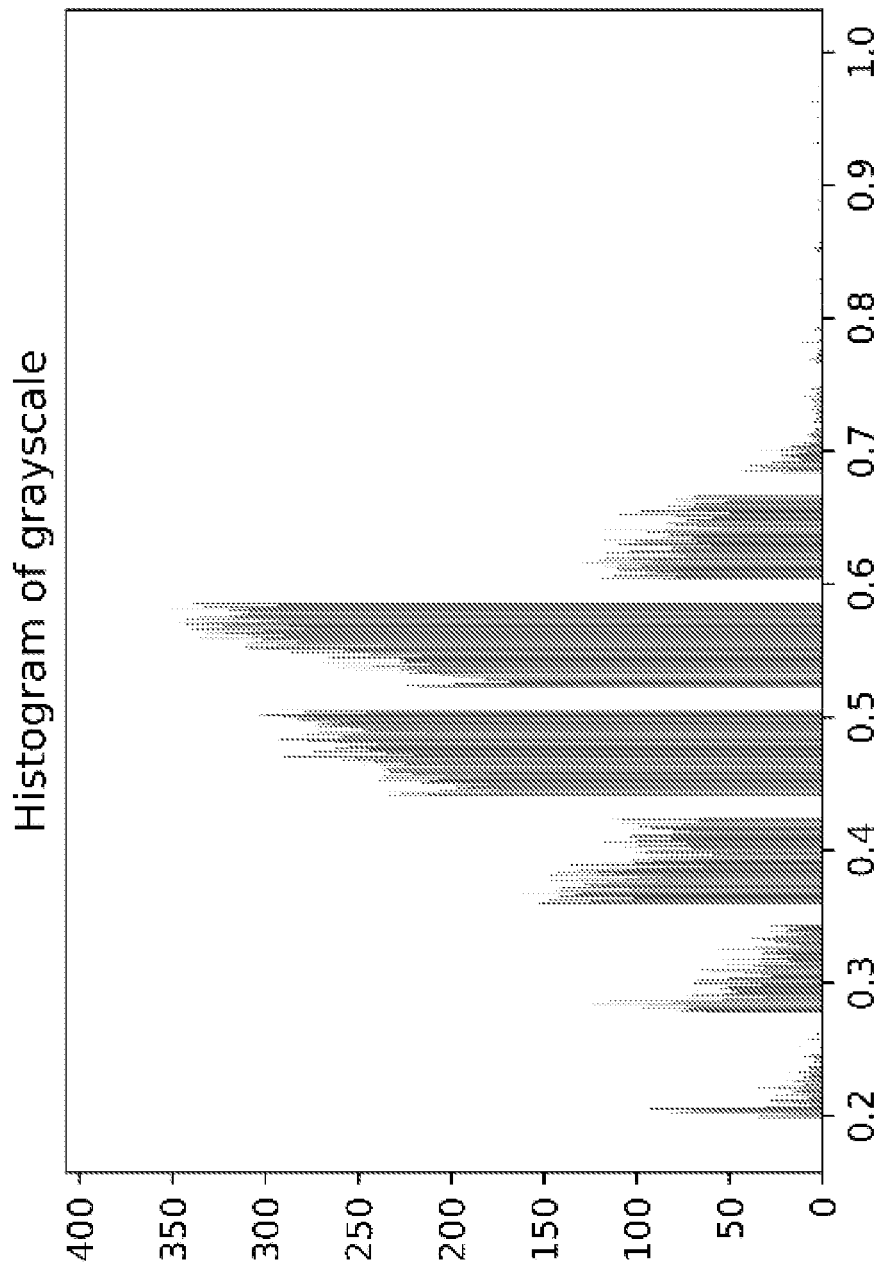
FIG. 20 shows an image analysis greyscale illustration for plain geopolymer KCT0.0.

Image analysis was implemented using computer programming to characterize the pore phase. A greyscale histogram was used to determine porosity phase (dark). FIG. 19 shows images, with markers, and after analysis. The four images of plain geopolymer KCT0.0 in FIG. 19 show the image analysis porosity. The black areas represent the porous areas. FIG. 20 shows one greyscale histogram of a plain geopolymer image. The greyscale less than 0.35 as porosity was selected. Using a calculation from the microscope images, the average porosity was 8.70%, 4.58%, 5.67%, and 7.07% for KCT0.0, KCT0.3, KCT0.6, and KCT1.5. Thus, a decrease in porosity with the addition of 0.3 wt. %, 0.6 wt. % and 1.5 wt. % MWCNTs was observed.

Fourier-Transform Infrared Spectra

Figure 21A:
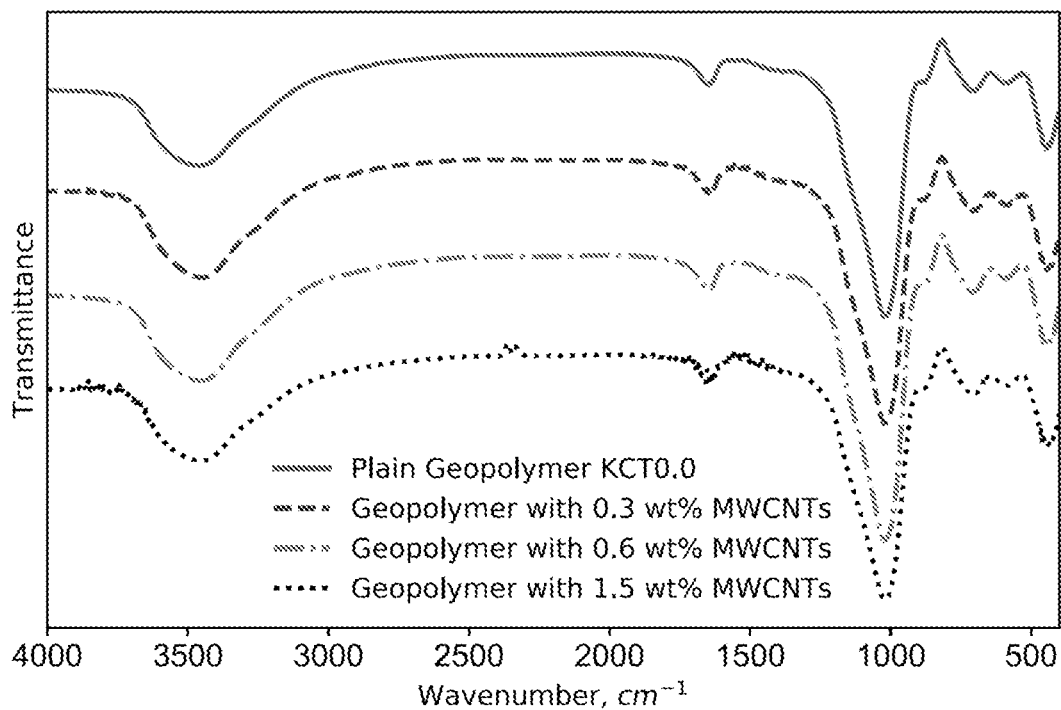
FIGS. 21A-21B show FTIR results of KCT0.0, KCT0.3, KCT0.6, KCT1.5.
Figure 21B:
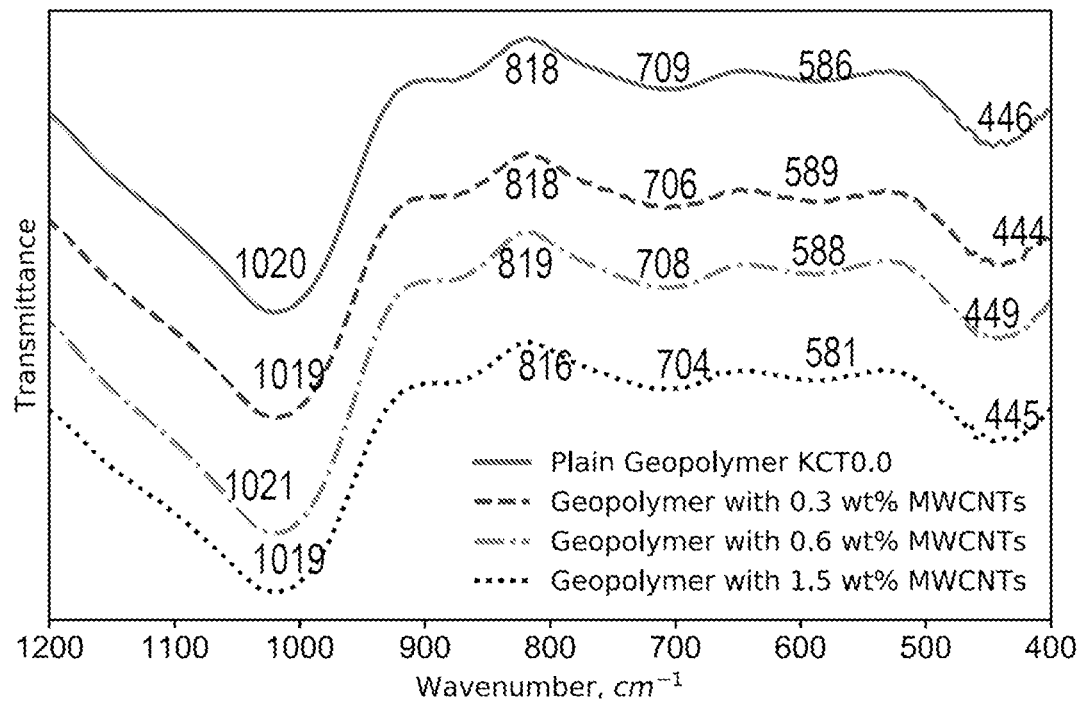

FTIR spectra data is shown in FIGS. 21A-21B. FIG. 21A represents the raw data from 400-4000 $cm^{-1}$ while FIG. 21B represents a smaller region for the chemical group in a clear way with marked peaks from 400-1200 $cm^{-1}$.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A carbon nanotube-reinforced geopolymer composite comprising:
 a potassium metakaolin-based geopolymer matrix; and
 multiwalled carbon nanotubes dispersed in the potassium metakaolin-based geopolymer matrix, wherein the concentration of the multiwalled carbon nanotubes is in the range from 0.55 to 1.5 weight percent, per weight of potassium metakaolin in the potassium metakaolin-based geopolymer matrix;
 the carbon nanotube-reinforced geopolymer composite having a porosity in the range from 5.5% to 7.5%, an indentation modulus in the range from 7.5 to 8.5 GPa, and a fracture toughness in the range from 0.58 Mpa·sqrt(m) to 0.65 MPa·sqrt(m), wherein the carbon nanotube-reinforced geopolymer composite is free of organic surfactants and organic dispersing agents and the multiwalled carbon nanotubes are not functionalized with surface carboxy groups.

2. The composite of claim 1 having a plastic viscosity of at least 10 Pa·s.

3. The composite of claim 1 having a yield shear stress of at least 50 Pa.

4. A method of making a carbon nanotube reinforced geopolymer composite, the method comprising:
  forming an aqueous dispersion of multiwalled carbon nanotubes;
  ultrasonicating the aqueous dispersion;
  subsequently dissolving potassium hydroxide and silica in the aqueous dispersion to form a waterglass solution;
  adding potassium metakaolin to the waterglass solution to form a geopolymer solution;
  mixing and degassing the geopolymer solution in a centrifugal mixer; and
  curing the geopolymer solution with continuous mixing to form the carbon nanotube reinforced geopolymer composite,
  wherein the concentration of the multiwalled carbon nanotubes in the carbon nanotube-reinforced geopolymer composite is in the range from 0.55 to 1.5 weight percent, per weight of potassium metakaolin;
  the carbon nanotube-reinforced geopolymer composite having a porosity in the range from 5.5% to 7.5%, an indentation modulus in the range from 7.5 to 8.5 GPa, and a fracture toughness in the range from 0.58 MPa·sqrt(m) to 0.65 MPa·sqrt(m),
  wherein the carbon nanotube-reinforced geopolymer composite is free of organic surfactants and organic dispersing agents and the multiwalled carbon nanotubes are not functionalized with surface carboxy groups.

* * * * *